United States Patent [19]

Gordon et al.

[11] 3,731,281

[45] May 1, 1973

[54] RECIRCULATING STORE CIRCUIT FOR TIME-DIVISION SWITCH PROCESSOR

[75] Inventors: Travis Hill Gordon, Patrick John Marino, Middletown; Randolph John Pilc, Holmdel, all of N.J.

[73] Assignee: Bell Telephone Laboratories, Incorporated, Murray Hill, Berkeley Heights, N.J.

[22] Filed: June 28, 1971

[21] Appl. No.: 157,155

[52] U.S. Cl. ....................340/172.5

[51] Int. Cl. ....................H04j 3/00, G11c 21/00

[58] Field of Search....................340/172.5; 179/15 A

[56] References Cited

UNITED STATES PATENTS 3,334,331 8/1967 Bartlett....................179/15 A
3,404,237 10/1968 Bartlett....................179/15 A
3,334,186 8/1967 Soos....................179/15 A

*Primary Examiner*—Gareth D. Shaw
*Attorney*—R. J. Guenther et al.

[57] ABSTRACT

In a time-division switch, a recirculating store alternatively stores address words and channel status words. When two subscribers are interconnected, the store applies address words to an address bus to enable the switch to steer data from one subscriber to the other. When a channel is idle or a call is being set up, the store passes status words to a processor to define the state of the channel. The processor, in turn, and under control of the store output words together with data from the channel, alternatively provides new address words and new status words to the store. If the processor does not provide a new word to the store, the store output is recirculated back to the input.

12 Claims, 11 Drawing Figures

INVENTORS T. H. GORDON
P. J. MARINO
R. J. PILC
BY R C Lipton
ATTORNEY

FIG. 2A

| | STATUS WORD INPUT TERMS 1 THRU 4 | REMAINDER OF INPUT INPUT TERMS 5 THRU 11 | NEXT STATUS WORD OUTPUT TERMS 1 THRU 4 | REMAINDER OF OUTPUT OUTPUT TERMS 5 THRU 14 |
|---|---|---|---|---|
| STATE OPC1 | 1001 | IDLE 1000/ØØØ | NO CHANGE 0000 | 0000/0000/00 |
| | 1001 | ON-HOOK 0100/ØØØ | NO CHANGE 0000 | 0000/0000/00 |
| | 1001 | OFF-HOOK OR FREE 0010/1ØØ | OPC2 1010 | 1000/0010/00 |
| | 1001 | OFF-HOOK NO OR 0010/0ØØ | OPC20 1111 | 1000/1000/00 |
| | 1001 | ALL OTHER PATTERNS | NO CHANGE 0000 | 0000/0000/00 |
| STATE OPC2 | 1010 | ON-HOOK 0100/ØØØ | OPC20 1111 | 1000/0000/01 |
| | 1010 | ADDRESS CHARACTER 1 0001/Ø0Ø | NO CHANGE 0000 | 0000/0000/10 |
| | 1010 | ADDRESS CHARACTER 2 0001/Ø1Ø | OPC3 1011 | 1000/0000/10 |
| | 1010 | OFF-HOOK 0010/ØØØ | NO CHANGE 0000 | 0000/0000/00 |
| STATE OPC3 | 1011 | ON-HOOK 0100/ØØØ | OPC20 1111 | 1000/0000/01 |
| | 1011 | ALL OTHER PATTERNS | OPC4 1100 | 1000/0001/00 |
| STATE OPC4 | 1100 | ON-HOOK 0100/ØØØ | OPC20 1111 | 1000/0000/01 |
| | 1100 | ALL OTHER PATTERNS | OPC5 1101 | 1100/0000/00 |

FIG. 2B

| | | | | |
|---|---|---|---|---|
| STATE OPC5 | 1101 | ANY BYTE FREE OUTPUT CHANNEL ØØØØ/ØØ1 | CROSS-OFFICE ADDRESS 0000 | 0001/0000/01 |
| | 1101 | ANY BYTE NO OUTPUT CHANNEL ØØØØ/ØØ0 | OPC20 1111 | 1000/1000/01 |
| STATE OPC20 | 1111 | ALL PATTERNS | OPC1 1001 | 1000/0100/00 |
| CROSS OFFICE ADDR. | 0ØØØ | ON-HOOK 0100/ØØØ | OPC1 1001 | 1010/0000/00 |
| | 0ØØØ | ALL OTHER PATTERNS | CROSS-OFFICE ADDRESS 0000 | 0000/0000/00 |

FIG. 2C

| INPUT TERM. NO | |
|---|---|
| 1 | DECODED STATUS/ADDRESS WORD |
| 2 | |
| 3 | |
| 4 | |
| 5 | IDLE |
| 6 | ON-HOOK |
| 7 | OFF-HOOK |
| 8 | ADDRESS CHAR. |
| 9 | OR AVAILABLE |
| 10 | ONE CHAR. STORED |
| 11 | FREE OUTPUT CHANNEL |

| OUTPUT TERM. NO | |
|---|---|
| 1 | NEXT STATUS WORD |
| 2 | |
| 3 | |
| 4 | |
| 5 | NOPC |
| 6 | SET REVERSE |
| 7 | OPEN CIRCUIT |
| 8 | SET FWD/SEND RING |
| 9 | SEND BUSY |
| 10 | SEND IDLE |
| 11 | SEIZE OR/SEND DT |
| 12 | TRANSLATE |
| 13 | STORE OR |
| 14 | FREE OR |

FIG. 2D

| |
|---|
| FIG. 2A |
| FIG. 2B |

Patented May 1, 1973 3,731,281

8 Sheets-Sheet 4

ORIGINATING REGISTER SELECTOR 14

ORIGINATING REGISTERS 13 AND TRANSLATOR 16

WRITE CONTROL 17 AND ADDRESS REGISTER 10

Patented May 1, 1973 3,731,281

8 Sheets-Sheet 8

RECIRCULATING STORE CIRCUIT FOR TIME-DIVISION SWITCH PROCESSOR

FIELD OF THE INVENTION

This invention relates to time-division switching systems for interconnecting incoming data channels to outgoing channels or ports by way of a common time-division multiplex data bus and, more particularly, to processors for controlling the formation and termination of talking connections and the generation and transmission of various supervisory signals in switching systems of the time-division multiplex type.

DESCRIPTION OF THE PRIOR ART

In the known forms of communication systems, common transmission paths may individually accommodate a plurality of signaling channels on a time-division multiplex basis. On these paths, each channel is assigned a time slot in a cycle or frame which is regularly repeated. Each time slot provides an interval during which the transmission path carries data which defines a sample or samples of the message signal from the channel source.

Switching systems for interconnecting channels on various common transmission paths must have the capability of interconnecting an incoming channel in any time slot on any one path with an outgoing channel in any time slot on any other path. More specifically, the switch must provide both time switching (time slot interchange) and space switching (line interconnection). The time switching interchanges the data in time from the time slot assigned to the incoming channel to the time slot assigned to the outgoing channel. The space switching transfers the data from the incoming transmission path to the outgoing path.

When large pluralities of lines are interconnected, it is desirable, from an economic point of view, to employ a common switch. To this end, a preferred system organization is arranged to multiplex all the channels from all the incoming transmission paths onto a common data bus to create a superframe of data wherein each time slot in the superframe is assigned to a specific incoming channel on any one of the incoming paths. A time-division switch then provides the appropriate time and space switching to distribute the data from each time slot on the data bus to the desired output port, that is, the desired time slot on the desired outgoing path.

In modern switching practices, the switch is divided into two portions; namely, the actual switch structure or organization which interchanges the data and interconnects the channels and the processor which develops data that controls the operations of the switch.

A preferred switch structure for interchanging data is disclosed in the copending application of T. H. Gordon-P. J. Marino-R. J. Pilc, Ser. No. 128,767, filed Mar. 29, 1971. The application discloses a multi-lead data bus which accommodates the bits of a data byte, in parallel, during each time slot and further discloses a multi-lead address bus which accommodates the bits of an address word, in parallel, during each time slot. The switch structure, in a single switching action, transfers the data byte from the data byte bus to an output port dedicated to the outgoing channel, as directed by the accompanying address word on the address bus. The output port then passes the bits of the byte onto the desired outgoing path and within the appropriate time slot. The generation of the address words and the application of the words to the address bus in the appropriate time slots are functions provided, in part, by an address register or list which is one of the several circuits in the processor.

In systems wherein subscribers may call other subscribers, the general functions of the processor are to maintain a record of the status of each subscriber channel or the call progress of each call, to generate and transmit to the subscribers various supervisory signals, to process incoming information on the byte bus, to complete talking connections between subscribers and to take down the connections when a subscriber disconnects. More specifically, the processor recognizes the initiation of a call by any incoming channel; returns "dial tone" to the originating subscriber; selects an originating register; stores "dialing" or address characters sent by the subscriber in the originating register; translates the dialing characters to a cross-office address word which identifies the terminating subscriber; sends "ringing" to the terminating subscriber; applies the cross-office address word of the originating subscriber to the address bus during the time slot dedicated to the terminating subscriber to set up the reverse connection; and applies the cross-office word of the terminating subscriber to the address bus during the time slot dedicated to the originating subscriber to complete the forward connection. The processor also takes down the connection when one of the parties disconnects.

It is appreciated that the processor, in addition to monitoring the byte bus, stores information relating to each channel. As noted above, the processor stores or maintains a record of the status of each channel, including the progress of each call initiated by the subscriber. During the set-up of the call, the processor, after selecting an originating register, stores or records the identity of the selected register. Thereafter, when the talking connection (forward and reverse) is complete, the processor stores or maintains a record of the cross-office address words of both subscribers in the connection.

Since the system is of the time-division type, stored information is required in each frame during the time slot allocated to the subscriber. A store particularly suitable for rendering available information during any time slot in successive frames is a recirculating store or delay line similar to the address list shown in FIG. 1 of the Gordon et al. application. In the Gordon et al application, the address list comprises a multistage shift register, the number of stages corresponding to the number of time slots in a frame, and each stage containing a sufficient number of cells to store an address word. The address list applies a different address word to the address bus during each of the time slots in a frame and, by recirculating the word back to the input of the address list, reapplies the word to the bus during the corresponding time slot in the next frame. If a new address word is to be applied to the address bus, this new word may be applied to the input of the list instead of recirculating the word on the bus. Although the Gordon et al application discloses that the recirculating store records only address words for application to the address bus, it is apparent that a store of this nature may be used by the processor to store any information relating to a channel.

As the system increases in size and more channels are interconnected, the number of time slots on the byte bus must be increased. In addition, since a larger number of output ports are to be identified, the number of bits in the address word must be increased. This, in turn, increases increase both the number of stages and the number of cells per stage in the address store. Assuming that similar recirculating (or delay line) stores are utilized for the status and register identity words, the number of stages in each of these two stores is similarly increased. In large systems, the number of stages becomes substantial and is accompanied by a substantial in crease in cost.

It is one object of this invention to decrease the cost of processors, especially decrease the cost of stores of the above-described type.

It has been noted that the processor requires various information during various states of each channel. It has further been noted that each item of information may advantageously be stored in a recirculating store such as a shift register which renders the information available during the time slot allocated to the channel. Nevertheless, the processor must decide, during the progress of each call, during each talking connection and during the channel's idle state, which item or items of information it requires and must then proceed to the proper store to obtain the information. This tends to increase the complexity of the processor.

Accordingly, it is another object of this invention to reduce the complexity of the processor by simplifying the obtaining of information.

SUMMARY OF THE INVENTION

We have discovered that the address words identify, in effect, a status of the channel; namely, the "talking" or "connected" status. Accordingly, the processor develops either a status word or, alternatively, an address word to define the channel status. Since the words are developed alternatively, only one store is required. Accordingly, both the status words and the address words are stored in the address list, to thereby eliminate the need for a separate status word store.

As previously noted, the Gordon et al application utilizes the address list as a recirculating store for supplying address words to the address bus. It is a feature of this invention that the address list (now used as a common store for status and address words) additionally provides the status information for the processor. In accordance therewith, the processor monitors the output of the store, whereby the status information of the channel and the address words are continuously available in one accessible location to reduce the complexity of the processor.

We have indicated that, in large systems, the address words have an increasingly greater number of bits. The status word, however, does not similarly change. It is therefore to be expected that the number of output ports is many times the number of channel states. The status word, therefore, contains only a fraction of the number of bits used in the address word. Accordingly, in the address list, only a portion of the cells required for storing the address word in each stage is reserved for the storage of the status word. It is a feature of this invention that cells in the unreserved portion are used to store the originating register identity word. This eliminates the need for a further separate store for the identity word and renders more information available to the processor in one accessible location.

The foregoing and other objects and features of this invention will be more fully understood from the following description of an illustrative embodiment thereof taken in conjunction with the accompanying drawings.

BRIEF DESCRIPTION OF THE DRAWINGS

In the drawings:

FIG. 2A and FIG. 2B, when arranged as shown in FIG. 2D, depict the various states of the processor control logic circuit together with the input information and output words thereby produced by the control logic, while FIG. 2C shows a table identifying the input and output terminals of the control logic and the information and word appearing thereon;

DETAILED DESCRIPTION

GENERAL ORGANIZATION

Figure 1:
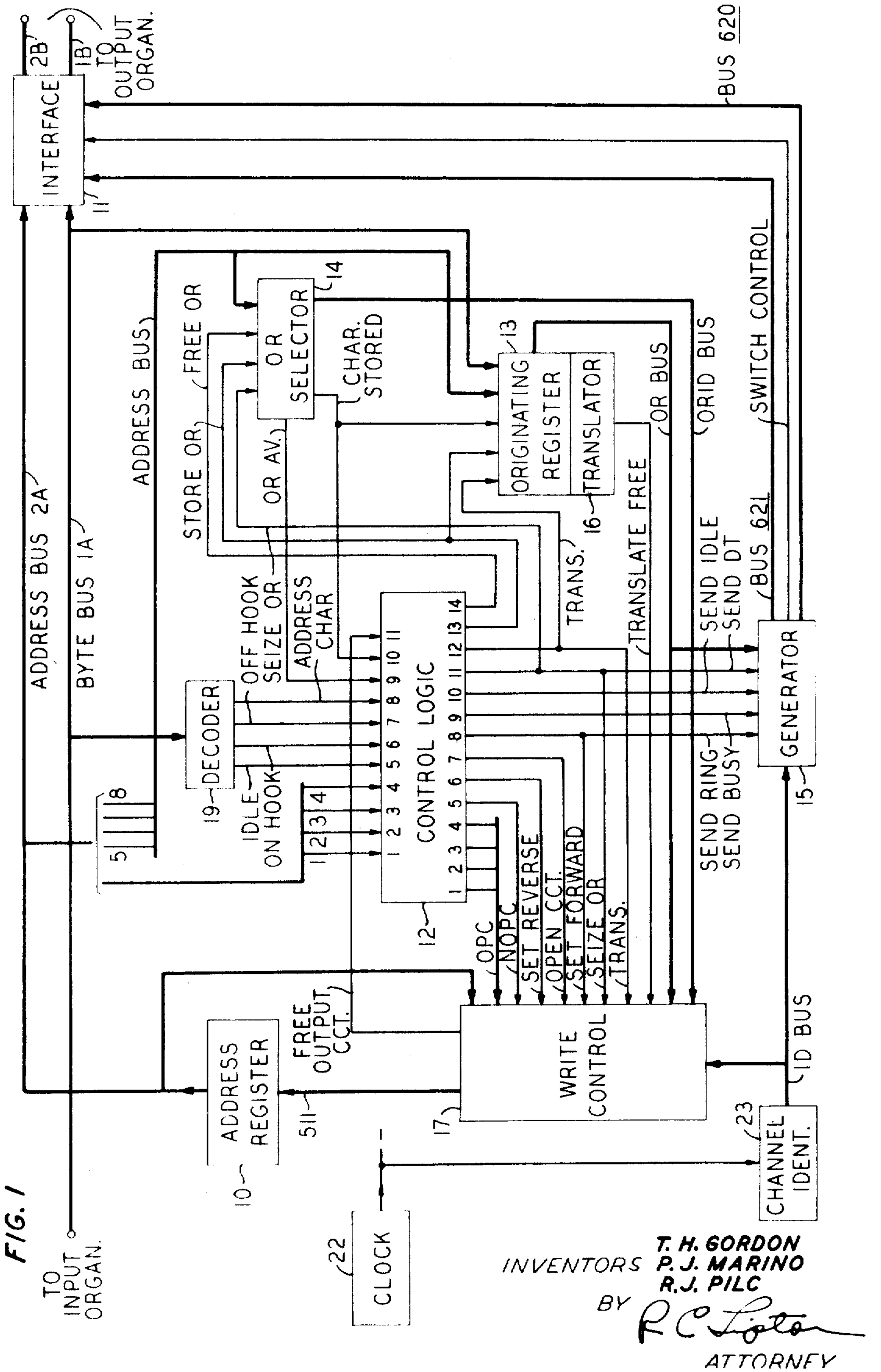
FIG. 1 shows, in block form, the general organization of the processor and the manner in which the various circuits therein cooperate.

A common byte bus is shown in FIG. 1. The incoming portion is identified as byte bus 1A. The outgoing portion is identified as byte bus 1B. Byte bus 1A and byte bus 1B are interconnected by interface 11. Incoming bytes are applied to byte bus 1A by an input organization, not shown, which organization may advantageously be the same type as input organization 100 disclosed in the above-identified T. H. Gordon et al application. The "incoming" address bus for the time-division switch is identified in FIG. 1 as address bus 2A. The outgoing address bus is bus 2B. Address bus 2A and address bus 2B are also interconnected by interface 11.

In accordance with the present embodiment, byte busses 1A and 1B comprise eight parallel leads, enabling the bus to accommodate, for any time slot, an eight-bit byte or character. Address busses 2A and 2B comprise 16 parallel leads, enabling the busses to accommodate, for any time slot, a 16-bit address word. As disclosed hereinafter, address bus 2A, on alternative occasions, will accommodate call progress or status words and other supervisory characters or words having four bits each. On these alternative occasions the call progress or status word will be accommodated on an initial four leads, while other supervisory words (specifically, originating register identity words) will be accommodated on a second four leads in address bus 2A. The address words, the status words and the OR identity words are all applied to address bus 2A by address register 10, which is a part of the processor.

As disclosed in the above-identified Gordon et al application, the input organization assembles, from each incoming channel, an eight-bit byte or character, the bytes from the several channels are then applied, interleaved, to byte bus 1A to create a frame, each byte being passed in parallel, to byte bus 1A in a time slot dedicated to the incoming data channel. As each byte appears in its time slot on byte bus 1A, the address register applies an address word (designating the outgoing channel) to address bus 2A during a concurrent time slot. This concurrent time slot is therefore also dedicated to the incoming data channel. The address word, together with the byte, are applied to the output organization which has the capability of disassembling the byte and serially passing the byte to the outgoing channel defined by the address word.

In general, the processor includes control logic 12, write control 17 and address register 10, together with other peripheral units described below. Address register 10 comprises a multistage shift register, the number of stages preferably corresponding to the number of time slots in each frame. Address register 10 may be driven by a time slot clock, such as clock 22, which clock has an output clock pulse for each time slot. Each stage in address register 10 has 16 cells, one cell for each bit in an address word and, correspondingly, for each lead of address bus 2A. As disclosed hereinafter, when a channel is connected to another channel, the first stage of address register 10 applies a 16-bit word to address bus 2A during the time slots of the channel. If the channel is not part of a connection, address register 10 applies a status word or a status word together with an originating register identity word to address bus 2A during each of the channel's time slots.

It is the general function of write control 17 to write into address register 10 (1) the appropriate status words when the call progress status of the channel changes, (2) the identity of an originating register when it is seized, and (3) the appropriate cross-office address words to complete the talking connection, and to recirculate the word applied to address bus 2A by address register 10 to the last stage of the address register when there is no change in the call progress status.

The determination of the next call progress status of the channels is provided by control logic 12. This determination is made in accordance with the information on address bus 2A, together with the information on byte bus 1A. The information on byte bus 1A is obtained by decoder 19 and a translation of this character is then passed to control logic 12. In general, control logic 12 therefore utilizes the information on the busses (and, in some instances as described hereinafter, other information provided by peripheral units) to determine the next state of the data channel. Control logic 12 thereupon advises write control 17 of this next state (and, in addition, provides instructions for the several other peripheral units). As noted above, write control 17 thereupon writes the appropriate words into address register 10. It is therefore noted that the sequence of functions involves writing in the appropriate information into address register 10, passing the information on to address bus 2A whereupon control logic 12 interprets the information, and then instructs write control 17 whether or not to write new information into address register 10 or recirculate the old information. The manner in which control logic 12, write control 17 and address register 10 cooperate, therefore, may be said to define the sequential operations of a sequential machine.

Proceeding now to the peripheral units noted above, these are identified as originating register (OR) selector 14, originating registers 13, together with translator 16, generator 15 and channel identifier 23. It is the function of channel identifier 23 to identify each time slot and, therefore, identify each incoming channel. Channel identifier 23 may comprise, for example, a conventional binary counter and, being driven by time slot clock 22, provides a different number for each time slot. Advantageously, the number identification provided by the channel identifier also comprises the 16-bit cross-office address word of the particular channel. This 16-bit number identification is passed to the ID bus.

Generator 15 is a logic and generator circuit which among its other functions generates certain supervisory characters used in common communication practices, such as a "busy" character, an "idle" character, a "dial tone" character and a "rining" character. The other functions of generator 15 involve instructing interface 11 to overwrite one of these call progress characters onto byte bus 1B and at the same time to overwrite a cross-office address word onto address bus 2B, the cross-office address being obtained either from the ID bus, which extends from channel identifier 23, or the OR bus, which extends from originating registers 13.

Originating registers 13 are a plurality of registers or memories, each register having the capability of storing a 16-bit cross-office address word. During certain call progress intervals a register stage in originating registers 13 may be utilized to store one or both of the eight-bit address characters sent by an originating subscriber. Translator 16 functions to translate the two address characters stored by the originating register, convert the characters to the 16-bit cross-office word identifying the terminating subscriber and rewrite the cross-office word back into the originating register which originally stored the address characters. This cross-office word is applied to the OR bus to be utilized by write control 17 and generator 15 as noted above.

OR selector 14 is a control circuit for selecting and seizing originating registers and reading information into the originating registers. More specifically, OR selector 14 maintains a record as to which originating register in registers 13 is available and an additional record as to whether an address character has been inserted in the originating register. The identity of the next available originating register is passed to the ORID bus, to be utilized by write control 17, as previously disclosed. The information noting whether or not an address character has been inserted in the register is passed to the CHARACTER STORED lead and then utilized by control logic 12 and originating registers 13.

CONTROL LOGIC

Considering control logic 12 in more detail, this circuit advantageously comprises a multiterminal switching circuit or network, sometimes called a combinational switching circuit, wherein a set or sets of input variables determine corresponding output conditions. Switching networks for combinational switching circuits of this type are described, for example, in Chapter 9, pages 135 to 156, of *Introduction to the Logical Design of Switching Systems* by H. C. Torng, published by Addison-Wesley Publishing Company, Copyright 1964.

As indicated above, a defined input pattern is applied to control logic 12 for each time slot. Accordingly, control logic 12 provides a corresponding output pattern for each time slot. As seen in FIG. 1, each input lead terminates on an individually numbered input terminal of control logic 12 and each output lead extends from an individually numbered output terminal of control logic 12. More specifically, the first four leads from address bus 2A are connected to input terminals 1 through 4. As noted above, these four leads carry the call progress status word while the channel is IDLE and while the call is being set up and carry the first four bits of the cross-office address word while the subscribers are interconnected.

Input terminals 5 through 8 are connected to the outputs of decoder 19. The bit pattern on terminals 5 to 8, therefore, comprises the decoded or translated byte that appears on byte bus 1A. Input terminals 9 and 10 are connected to the OR AVAILABLE and CHARACTER STORED leads originating from OR selector 14. Finally, input terminal 11 is connected to the FREE OUTPUT CHANNEL lead extending from write control 17. The function of this latter lead will be described hereinafter.

There are fourteen output terminals in control logic 12. Output terminals 1 to 4 are connected to the OPC bus and the parallel bits of the next status word are applied to these output terminals. Output terminal 5 is connected to lead NOPC and control logic 12 applies a bit to this lead which instructs write control 17 to overwrite the new status word into address register 10. Output terminals 10 and 9 are connected to leads SEND IDLE and SEND BUSY, respectively. The application of a bit to output terminal 11 provides the instruction via lead SEIZE OR/SEND DIAL TONE to seize an originating register and send the "dial tone" character. The application of a bit through output terminal 13 to lead STORE OR enables the originating register to store an incoming address character. The instruction to translate the address characters is applied to lead TRANSLATE by way of output terminal 12. Control logic 12 provides the instructions to set up the "reverse" connection and to set up the "forward" connection by applying bits to leads SET REVERSE and SET FORWARD by way of output terminals 6 and 8, respectively. The release of an originating register is provided by the application of a bit through output terminal 14 to lead FREE ON. Finally, opening or disconnecting a connection is initiated by the application of a bit to lead OPEN CIRCUIT via output terminal 7.

CONTROL LOGIC STATE TABLES

To define in detail the specific sequential operations of the sequential machine and, more specifically, the sequential states of control logic 12, the table shown in FIGS. 2A and 2B, when arranged as shown in FIG. 2D is presented. For additional information, two tables are shown in FIG. 2C, the first table having a first column which identifies the numbers of the various input terminals of control logic 12 and a corresponding second column which defines the functions of the lead or group of leads extending to the corresponding input terminal. Similarly, in a second table, the first column identifies the numbers of the several output terminals of control logic 12 and the second column defines the functions of the output lead or group of leads extending from the corresponding output terminal.

The table shown in FIGS. 2A and 2B is arranged in four columns. As stated in the heading of the first column, this column defines the status word applied to control logic 12 and, accordingly, describes the bit pattern applied to input terminals 1 through 4. The second column is directed to the bit pattern applied to the remaining input terminals 5 through 11 of control logic 12. The next status word is identified in the third column which therefore shows the output bit pattern on output terminals 1 through 4. Finally, the last column is directed to the bit pattern on the remaining output terminals 5 through 14. The various lines in the table are grouped together in accordance with the call progress state or status of the processor. It is noted, therefore, that in the first state, namely, state OPC1, there are depicted five different input patterns of interest that are applied to control logic 12.

In the table each 1 and each 0 corresponds to a 1 bit or a 0 bit on the identified terminal. A $\phi$ entry indicates an immaterial condition. An examination of several lines as examples will suffice for all the lines. Initially, refer to the several lines under the general heading "-State OPC1". Under this condition the central processor present state is OPC1 and the input status word OPC1 (1001) is applied to input terminals 1 through 4. Selecting now the third line in the OPC1 state, it is seen that the OPC1 bit pattern is shown in the first column. The second column indicates that an "off-hook" byte or character is being received from the originating subscriber and an originating register is free. This input bit pattern, for input terminals 5 through 11, is 0010/1$\phi\phi$. The slash interposed between the fourth and fifth bits in this sequence is for the convenience of the reader to readily separate out the groups of bits. It is readily recognized, therefore, that the translated code sequence of the "off-hook" byte constitutes the four bits 0010, which bits are applied to input terminals 5 through 8. The next bit (after the slash) is applied to input terminal 9 and constitutes a 1 bit. By referring to the first table in FIG. 2C, it is seen that this indicates that an originating register is available. The remaining bits are immaterial. As a result (in accordance with the third column), control logic 12 applies an OPC 2 status word (1010) to output terminals 1 through 4 and the bit pattern 1000/0010/00 to the remaining output terminals. Therefore, 1 bits are applied to output terminals 5 and 11. The application of the 1 bit to output terminal 5 instructs (as described in detail hereinafter) write control 17 to overwrite the OPC2 word into address register 10. Referring to the second table in FIG. 2C, it is seen that the bit on output terminal 11 provides the instruction to seize an originating register and, at the same time, to send the "dial tone" character. Each of the other switch functions of control logic 12 can similarly be determined from an examination of the table together with an understanding of the sequential operation of the processor, as described hereinafter.

SEQUENCE OF OPERATIONS

Consider now that, for any time slot, the processor is in the initial IDLE condition or state. During this time slot, the first stage of address register 10 is applying to the address bus 2A, and the address bus is in turn applying to input terminals 1 to 4 of logic circuit 12, a status word which defines the IDLE state. This status word is designated OPC1 and the bit sequence of the word, in serial bit form, comprises 1001. Assuming that the incoming channel occupying this time slot is in the IDLE condition, or in the "on-hook" condition, the byte bus carries an "idle" data word or an "on-hook" data word during the time slot. The data word ("idle" or "on-hook") is decoded by decoder 19, which, in turn, provides a translated code sequence (the bit sequence 1000 or 0100) to input terminals 5 to 8 of control logic 12. This input condition (the application of the IDLE status word to input terminals 1 to 4 and the translated "idle" or "on-hook" code sequence to terminals 5 to 8) is depicted in the first two columns of either the first or second line of the state chart shown in FIG. 2A, the remaining inputs to terminals 9 to 11 being immaterial. The consequent outputs of logic circuit 12 are shown in the second two columns of the first and second lines. These outputs constitute a 0 bit output pattern, output terminals 1 to 4 indicating no change for the next status word and output terminals 5 to 14 instructing the processor that there is no change in the processor functions for this time slot.

Concurrent with applying the status word to address bus 2A, the first stage of address register 10 passes the OPC1 status word to write control 17. When control logic 12 is not exercising any external control, write control 17 recirculates the status word to the last stage of the address register. The idle state status word OPC1 now will be shifted from the last stage, through the intermediate stages, to the first stage and will be reapplied to the address bus 2A during the same time slot in the next frame. The above sequence is thus again repeated, assuming the incoming channel remains IDLE or the subscriber remains "on-hook".

If the subscriber occupying the incoming channel originates a call by going "off-hook", an "off-hook" data word is transmitted and the time division switch inserts this data word in the time slot allocated to this originating subscriber. Decoder 19 detects the "off-hook" data word on byte bus 1A and applies a translated code sequence (such as 0010) to control logic 12. The OPC1 status word is concurrently being applied to control logic 12 by the address bus. This is depicted on the third and fourth lines for state OPC1 in FIG. 2A.

As described hereinafter, originating register selector 14 functions, in part, to indicate to control logic 12 whether an originating register in registers 13 is available. More specifically, originating register selector 14 is arranged to determine if an originating register is available, to indicate this availability to output lead OR AVAILABLE, to select and to seize the originating register, in response to a command from control logic 12 and to identify the seized originating register to the output ORID bus.

If it be assumed that an originating register is not available, selector 14 sends a 0 bit to lead OR AVAILABLE, which lead extends to input terminal 9 of control logic 12. We have assumed that the OPC1 status word and the "off-hook" data word are concurrently being applied to control logic 12. Under these input conditions, as seen on line 4 of state OPC1 in FIG. 2A, control logic 12 goes to the OPC20 (disconnect) state, applies the OPC20 status word (1111) to output terminals 1 to 4, applies a "write a new status word" (NOPC) bit through terminal 5 to the output NOPC lead, and applies a SEND BUSY bit to output terminal 9 (and thence to the output SEND BUSY lead). Write control 17, in response to the bit on the output NOPC lead, overwrites the new status word OPC20 into the last stage of address register 10 (rather than recirculating the old status word). Generator 15, in response to the bit on the SEND BUSY lead, obtains the identification of the time slot or channel concurrently on the ID bus from channel identifier 23, supplies the "busy" data word and the cross-office address word (which is advantageously arranged to be the same as the channel identification word) of the originating subscriber to interface unit 11, and applies a bit to the switch control lead extending to interface 11. Interface 11 thereupon overwrites the "busy" data word and the cross-office address word onto byte bus 1B and address bus 2B, respectively. Of course, these words are written into the busses in the time slot allocated to the originating subscriber.

In the subsequent frame, when the time slot of the originating subscriber again occurs, the OPC20 status word is applied to address bus 2A and passed to control logic 12. Regardless of other input conditions to control logic 12 (as shown for state OPC20 in FIG. 2B), the OPC1 word (1001) is applied to output terminals 1 to 4, the NOPC bit is applied to output terminal 5 and a bit is applied to the SEND IDLE output lead via output terminal 10. Generator 15, in response to the bit on the SEND IDLE lead, obtains the subscriber's identification from the ID bus from channel identifier 23, generates the "idle" data word, and enables interface 11 to overwrite the "idle" data word on byte bus 1B and the subscriber address on address bus 2B. Concurrently, write control 17 overwrites the OPC1 status word into the last stage of address register 10. The condition for the channel is thus returned to "idle" and the processor returns to the IDLE status.

Assume now that an originating register is available. In this event, originating register selector 14 sends a 1 bit through lead OR AVAILABLE to input terminal 9 of control logic 12. This is the input condition seen in line 3 of state OPC1 in FIG. 2A. The OPC1 status word and the translated "off-hook" code are concurrently being applied to control logic 12. The next status word will therefore be OPC2. Control logic 12 applies a bit to the SEND DIAL TONE/SEIZE OR lead by way of output terminal 11. This bit is passed to generator 15 and concurrently passed to write control 17 and to originating register selector 14. At the same time, control logic 12 applies the state OPC2 status word (1010) to output terminals 1 to 4 and applies the NOPC bit to output terminal 5.

The bit applied through output terminal 11 to the SEND DIAL TONE lead enables generator 15. The enabled generator obtains the subscriber identification from the channel identifier and enables interface 11 to overwrite the "dial tone" character on byte bus 1B and the address of the subscriber on address bus 2B. This same bit on output terminal 11 passes via the SEIZE OR lead to instruct originating register selector 14 to seize or select the available originating register in registers 13 and record an indication that the register is thereafter busy or unavailable. The identity of this seized register (the OR identity word) is passed by originating register selector 14 to write control 17 by way of the ORID bus. Finally, the bit on output terminal 11 instructs write control 17 to overwrite the originating register (OR) identity word obtained from the ORID bus, together with the state OPC2 status word, into the last stage of address register 10.

When the OPC2 status word is applied to the address bus, control logic 12 looks at byte bus 1A for incoming address characters from the subscriber (it being assumed that an address comprises two characters). At the same time, address register 10 is applying the OR identity word to address bus 2A and the word is passed by the address bus to originating register selector 14.

In addition to the function of determining whether an originating register is available, originating register selector 14 also indicates whether or not an address character or byte has been stored in the corresponding originating register. This function is provided in response to the appearance of the OR identity word on address bus 2A, selector 14 thereby identifying the originating register and indicating to lead CHARACTER STORED whether a character byte is stored in the originating register. At this time, of course, no character is stored in the originating register and selector 14 passes a 0 bit to the CHARACTER STORED lead and thence to input terminal 10.

Return now to the OPC2 state wherein the OPC2 code is applied to address bus 2A. Assume now that the channel is "off-hook" and the first address characters have not yet been sent by the subscriber. The translated "off-hook" character is applied by decoder 19 to control logic 12. This condition is depicted on line 4 of state OPC2 in FIG. 2A. Control logic 12 provides a 0 bit output pattern. Write control 17 therefore recirculates the OPC2 status word in address register 10 from the initial stage to the final stage. The OPC2 state of the circuit is thus maintained.

If, when the OPC2 status word is applied to address bus 2A, the originating subscriber goes "on-hook", the translated "on-hook" character is applied to control logic 12. In this event (as seen on line 1 of state OPC2 in FIG. 2A), control logic 12 goes to the OPC20 "-disconnect" state to disconnect the subscriber and return the processor to the initial IDLE condition. This operational sequence is described in detail hereinafter.

Assume now that the first address word is received on byte bus 1A. The word is scanned by decoder 19 and the translated word is applied to control logic 12. At the same time, of course, address bus 2A is applying the OPC2 status word and originating register selector 14 is indicating that no character is stored in the originating register (see line 2 of state OPC2). Control logic 12, in response thereto, applies a bit through output terminal 13 to the STORE OR lead. This bit instructs originating registers 13 to store the address word. The originating register identified by the OR identity word on address bus 2A is selected and the first address character is stored therein. At the same time, control logic 12 is applying the bit on the STORE OR lead to selector 14 and selector 14, in turn, now indicates that in address character is stored in the originating register.

Control logic 12 provides no function with respect to write control 17. Write control 17 therefore recirculates the originating register identity word and the OPC2 status word from the first stage to the last stage of address register 10.

Control logic 12 looks for the second address character when the OPC2 status word next appears on address bus 2A. Originating register selector 14, under control of the OR identity word on address bus 2A, is concurrently applying to input terminal 10 of control logic 12 a 1 bit indicating that one character is stored in the originating register.

If the word on byte bus 1A at this time indicates that the subscriber is still "off-hook" but has not yet sent the second address word, control logic 12 maintains the same status (line 4 of state OPC2). Write control 17, under this situation, recirculates the status word OPC2 and the OR identity word from the first stage to the last stage of address register 10. If the subscriber goes "on-hook" (line I of stage OPC2), control logic 12 goes to the OPC20 state, as described hereinafter.

In the event, however, that the second address word appears on byte bus 1A, the translation of this word is passed by decoder 19 to control logic 12. Other inputs to control logic 12 are, of course, the OPC2 status word provided by address bus 2A and the indication from originating register selector 14 that one character is stored in the originating register (see line 3 of state OPC2 in FIG. 2A). Control logic 12, in response thereto, passes a bit through output terminal 13 and then by way of the STORE OR lead to originating registers 13. At this time, of course, originating register selector 14, under control of the OR identity word on address bus 2A, sends to originating registers 13 a 1 bit indicating that one character is stored in the originating register. The OR identity word applied by the address bus to registers 13 selects the identified register and the second address character is shifted into the originating register with the previously stored first character.

In addition to enabling the storage of the second address character, control logic 12 also applies the OPC3 status word (1011) to output terminals 1 to 4 and concurrently passes the NOPC bit to output terminal 5. Write control 17, therefore, overwrites the OPC3 word into the last stage of address register 10. The OR identity word is again recirculated, whereby the last stage contains the new OPC3 word and the recirculated OR identity word.

In the next frame, the OPC3 status word is applied to the address bus and the processor goes to state OPC3. Assume that the subscriber has not gone to the "on-hook" condition. In this event (line 2, state OPC3 in FIG. 2A), control logic 12 passes the OPC4 status word (1100) to terminals 1 to 4, passes the NOPC bit to terminal 5, and applies a bit to output terminal 12 onto the TRANSLATE lead.

The bit on the TRANSLATE lead is applied to registers 13. This enables the address characters in the originating register (selected by the OR identity word) to be read out and applied to translator 16 under the assumption that translator 16 is not occupied in translating for another channel. Under this assumption, originating registers 13 apply a bit to the TRANSLATE FREE lead and translator 16 provides a conventional translation of the address words, converting them to the cross-office address code of the terminating subscriber identified by the address. This code is then reapplied back into the originating register. (The functions of translator 16, of course, are not necessary when the incoming address characters are arranged to be identical to the cross-office address code.)

The NOPC bit, the TRANSLATE bit and the TRANSLATE FREE bit are all applied to write control 17 together with the OPC4 status word. This enables write control 17 to overwrite the OPC4 word, and recirculate the OR identity word, into the last stage of address register 10. The processor, in the next frame, will proceed to the OPC4 state.

In the event that translator 16 is not free or available, originating registers 13 do not pass the bit to the TRANSLATE FREE lead. Write control 17, lacking this bit, recirculates the OPC3 status word and the OR identity word from the address bus to the last stage of address register 10. The OPC3 state will therefore be repeated for the next frame and each subsequent frame until translator 16 becomes available.

The originating subscriber might go "on-hook" at any time while the circuit is in the OPC2, OPC3 or OPC4 states. In any of these states, when the decoded byte is applied to input terminals 5 to 8, control logic 12 applies the OPC20 status word (1111) to output terminals 1 to 4, applies the NOPC bit to output terminal 5 and applies a bit through output terminal 14 to the FREE OR lead. The OPC20 status word is overwritten into the last stage of address register 10 by write control 17. The bit passed to the FREE OR lead is applied to originating register selector 14 which, in response thereto, returns to the original indications wherein the originating register is available and no characters are stored therein.

When the OPC20 status word is applied to address bus 2A, control logic 12 goes to the OPC20 state (FIG. 2B). As previously described, control logic 12 generates, in this state, the OPC1 (idle) status word and applies NOPC and 1 bits to the NOPC and SEND IDLE leads. Write control 17 overwrites into the last stage of address register 10 the OPC1 status word, the "idle" data word is written into byte bus 1B and the subscriber cross-office address word is written into address bus 2B, as previously described. The status of the channel is thus returned to the initial IDLE condition.

Return now to the situation where the OPC4 status word appears on address bus 2A. Control logic 12 goes to the OPC4 state. In this state the processor initiates the operation of writing the reverse connection into address register 10. Assume that the subscriber has not gone "on-hook". As seen in line 2 of state OPC4, control logic 12 applies a bit to output terminal 6, which is connected to the SET REVERSE lead, applies the OPC5 status word (1101) to output terminals 1 to 4 and the NOPC bit to output terminal 5. The bit on the SET REVERSE lead is passed to write control 17 to write in the "reverse connection". If the "reverse connection" circuit in write control 17 is not available (busy with another channel), write control 17 recirculates the OPC4 status word and the OR identity word back into address register 10. State OPC4 will be repeated until the reverse connection circuit becomes available.

Assume now that the "reverse connection" circuit in write control 17 is available. Write control 17 thereupon overwrites the OPC5 status word and recirculates the OR identity word into address register 10. In addition, write control 17 obtains and stores the cross-office address of the originating subscriber from the ID bus (which extends from channel identifier 23) and obtains the cross-office address word of the terminating subscriber from the OR bus (which extends to originating registers 13). Utilizing the terminating subscriber cross-office address word (and successive channel identifications provided by channel identifier 23), write control 17 selects the time slot which corresponds to the time slot of the terminating subscriber and reads off the status word on address bus 2A to determine whether or not the terminating subscriber channel is idle or busy, that is, whether or not the OPC1 status word is on the bus.

If the terminating subscriber is idle (the OPC1 word is applied to the bus by address register 10), write control 17 returns a 1 bit to input terminal 11 of control logic 12 and maintains this indication until it is subsequently knocked down. In addition, the cross-office address of the originating subscriber previously obtained from channel identifier 23 is overwritten into the last register stage of the terminating subscriber. It is noted that the cross-office address word thus written in will occupy all of the storage cells in the register stage, with the initial (or flag) bit of the address word occupying the same cell normally reserved for the initial (or flag) bit of the status word. This flag bit (for the cross-office address word) is always 0, whereas the status word flag bit is always 1. The processor will hereinafter be able to recognize the cross-office address word and determine that the subscriber is part of a "talking" connection.

Assume now that the terminating subscriber is BUSY (a word other than the OPC1 status word is applied to address bus 2A). A 0 bit is returned by write control 17 to input terminal 11 of control logic 12. When the OPC5 status word appears on address bus 2A and is applied to control logic 12, the logic circuit initiates the action to take down the call. (See line 2 of state OPC5 in FIG. 28.) Control logic 12 applies the OPC20 status word to output terminals 1 through 4, the NOPC bit to output terminal 5, a bit through output terminal 9 to the SEND BUSY lead, and a bit through output terminal 14 to the FREE OR lead. Write control 17 overwrites the OPC20 status word into the last stage of address register 10.

As previously described, the application of the bit to the SEND BUSY lead enables generator 15 (together with interface 11) to overwrite the cross-office address word of the subscriber onto address bus 2B and overwrite the "send busy" character onto byte bus 1B. The bit on the FREE OR lead is passed to originating register selector 14. As previously described, originating register selector 14, in response to the "free OR" bit, overwrites 0 bits into the flag cells to restore the indications that the originating register is available and that no character is stored therein.

When the OPC20 status code again appears on the address bus, control logic 12 initiates the operation of returning the "idle" code character to the originating subscriber and overwrites the OPC1 code into the address register, as previously described.

Return now to the condition wherein the reverse connection was completed and write control 17 applied a 1 bit to input terminal 11 of control logic 12. When the OPC5 status word appears on address bus 2A, control logic 12 applies a bit through output terminal 8 to the SET FORWARD lead and the SEND RING lead and applies a bit through output terminal 14 to the FREE OR lead. The "set forward" bit enables write control 17 to obtain the cross-office address word of the terminating subscriber from the OR BUS (extending from originating registers 13) and overwrite the word into the final stage of address register 10. At the same time write control 17 knocks down the 1 bit applied to input terminal 11 of control logic 12. The "-send ring" bit is applied to generator 15. Generator 15, in response to the bit, overwrites the "ringing" word onto byte bus 1B via interface 11, obtains the cross-office address word of the terminating subscriber from the OR bus (extending from originating registers 13) and overwrites this word onto address bus 2B via interface 11. The "ringing" character is therefore directed by the time-division switch to the channel of the terminating subscriber.

The "free OR" bit applied to output terminal 14 is passed to originating register selector 14. Selector 14, in response thereto, returns to the original "register available" and "no characters stored" indications, thus "freeing" the originating register.

With the cross-office address word of the terminating subscriber hereinafter appearing on the address bus during the time slot allocated to the originating subscriber and the cross-office address word of the originating subscriber hereinafter appearing on the address bus during the time slot allocated to the terminating subscriber, a time-division switch of the type disclosed in the above-identified application of T. H. Gordon et al will forward the data from the originating subscriber to the channel of the terminating subscriber and forward the data from the terminating subscriber to the channel of the originating subscriber. The processor, recognizing the flag bits of the cross-office addresses, will not interfere with the cross-office connection (see line 2 of the "Cross-Office Address" state in FIG. 2B) so long as neither subscriber sends a "disconnect" or "on-hook" word.

The "disconnect" or "on-hook" word may appear on the byte bus during either time slot, that is, during the time slot of the originating subscriber or the time slot of the terminating subscriber. The operation of the processor is substantially the same for the "disconnect" from either subscriber.

Assume that the "disconnect" signal is received from one of the communicating subscribers (hereinafter referred to as the A subscriber). The address code word of the other subscriber (hereinafter referred to as the B subscriber) is concurrently on address bus 2A. Decoder 19 accepts the "disconnect" or "on-hook" word from byte bus 1A and applies a translated word (0100) to control logic 12. Control logic 12 recognizes the address word on address bus 2A and the concurrent "on-hook" word on byte bus 1A and, in response thereto, applies the OPC1 code to output terminals 1 through 4, applies the NOPC bit to output terminal 5 and applies a bit through output terminal 7 to the OPEN CIRCUIT lead (see line 1 of the "Cross-Office Address"state in FIG. 2B).

The "open circuit" bit is passed to write control 17 to "take down" the call. If the "call take down" circuit is busy with another channel, however, write control 17 recirculates the address word in address register 10. The "Cross-Office Address" state is therefore repeated until the "call take down" circuit becomes available.

Assume now that the "call take down" circuit is free. Write control 17 overwrites the OPC1 status word into the last stage of address register 10. At the same time, write control 17 obtains the cross-office address of the B subscriber from address bus 2A and now locates the time slot allocated to the B subscriber. When the subscriber B time slot occurs, write control 17 overwrites the OPC1 status word into the last stage of address register 10. Both subscriber channels are therefore returned to the IDLE condition.

ORIGINATING REGISTER SELECTOR

Figure 3:
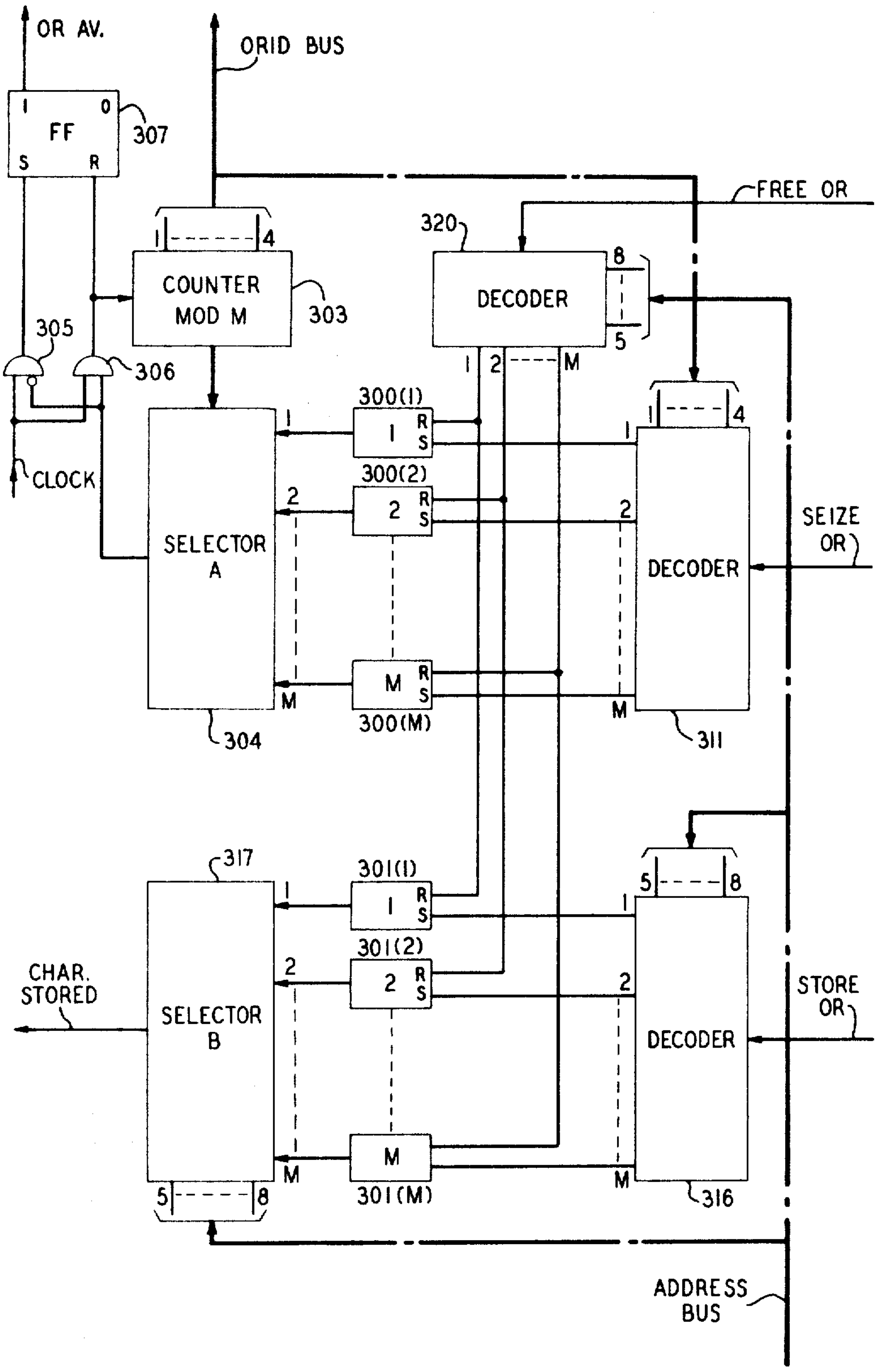
FIG. 3 shows, in schematic form, the circuitry which selects the originating register.

Originating register selector 14 is shown in FIG. 3. As previously indicated, the inputs to selector 14 comprise the OR identity word which is derived from address bus 2A, and the FREE OR, SEIZE OR and STORE OR leads, which latter three leads emanate from control logic 12, as previously described. The outputs of originating register selector 14 constitute the ORID bus which extends to write control 17 and the OR AVAILABLE and CHARACTER STORED leads which are connected to inputs of control logic 12, as previously described. The CHARACTER STORED lead also is connected to originating registers 13.

It is recalled that originating register selector 14 has the capability of determining whether an originating register is available and, further, has the capability of recording whether an address character or byte is stored in the originating register. For determining the availability of originating registers, selector 14 includes a storage cell individual to each originating register in registers 13, each cell having the capability of storing a bit. These cells are identified as cells 300(1) through 300(M) in FIG. 3. For recording the storage of an address byte in an originating register, selector 14 includes another storage cell individual to each originating register, these latter cells being identified as cells 301(1) through 301(M). It is noted that each cell has an incoming SET terminal and an incoming RESET terminal. Energization of the SET lead writes a 1 into the cell. Conversely, energization of the RESET lead writes a 0 into the cell.

Let us assume that originating register selector 14 is scanning for an available register. The scanning is provided by counter 303 in conjunction with selector 304. The function of selector 304 is to sequentially scan cells 300(1) through 300(M) under control of the output from counter 303. As each one of the cells is scanned, the bit therein is gated through selector 304 to the output thereof and thereupon is applied to gates 305 and 306. Assume that the cell being scanned is individual to an originating register which is unavailable. It is presumed, therefore, that the cell contains a 1 bit therein. This 1 bit is thus applied to gate 306 and gate 306 is, therefore, enabled to pass a clock pulse therethrough. The clock pulse, which may be derived from clock 22, FIG. 1, is applied to flip-flop 307 to reset the flip-flop or to maintain it in a RESET condition if it was previously reset. The OR AVAILABLE output lead is therefore in the low condition, that is, applying a 0 bit to input terminal 9 of write control 17, indicating that, at present, an originating register is not available. At the same time, the output bit from gate 306 is applied to counter 303 and counter 303, in response thereto, advances to its next count. Selector 304, in turn, thus scans the next cell.

Assume now that a cell individual to an available originating register is scanned. This cell is presently storing a 0 bit. The scanning of the cell by selector 304 results in the passage of the 0 bit to the output of the selector. This 0 bit is then applied to gate 306 to disable the gate. With the gate thus disabled, counter 303 stops and scanning terminates. At the same time, the 0 bit from selector 304 enables gate 305. Gate 305, accordingly, passes a clock pulse therethrough to set flip-flop 307. Flip-flop 307 now applies 1 bits to the OR AVAILABLE lead, indicating to control logic 12 that an originating register is available, as previously described. At the same time, with counter 303 halted, it generates an output address corresponding to its position in the scanning cycle. Since this position, in turn, corresponds to the scanning cell individual to the originating register now available, the output of counter 303 identifies the available originating register. This originating register identification word is therefore applied to the ORID bus and utilized by write control 17, as previously described.

It is recalled that when an "off-hook" is received and an originating register is available, control logic 12 sends a bit to the SEIZE OR lead. This bit is applied to decoder 311. Decoder 311 is controlled by the originating register identity word on the ORID bus to complete a path from the SEIZE OR lead to the SET input of the 200 cell corresponding to the available originating register. The bit on the SEIZE OR lead therefore inserts a 1 bit into the cell, to indicate that the originating register is now unavailable. Selector 304 thereupon gates the 1 bit therethrough to enable gate 306, as previously described. The clock pulse is, therefore, again passed through gate 306 to counter 303 and scanning resumes until another 300 cell indicating an available originating register is addressed.

It is recalled that write control 17 writes the OR identity word into address register 10. As noted hereinafter the OR identity word would therefore appear on leads 5 to 8 of address bus 2A during the next frame. Leads 5 to 8 of address bus 2A extend to selector 317. Selector 317, in response to the OR identity word, extends a path from the 301 cell identified by the OR identity word to the CHARACTER STORED output lead. The lead, therefore, indicates to control logic 12 and to originating registers 13 whether or not a character is stored in the originating register, as previously described.

Assume now that the first address character is received from the originating subscriber. No character is stored in the originating register and a 0 bit is therefore stored in the 301 cell. This 0 bit is passed by selector 317 to the CHARACTER STORED lead. At the same time, control logic 12 is applying a bit to the STORE OR lead. The bit on the STORE OR lead is passed to the input of decoder 316. The control inputs for decoder 316 comprise leads 5 to 8 of address bus 2A, which leads carry the OR identity word. Decoder 316 thereupon passes the bit on the STORE OR lead to the SET input of the 30 cell identified by the OR identity word. The 1 bit on the STORE OR lead therefore sets the 301 cell, inserting a 1 bit in the cell to now indicate that a character has been stored in the originating register. The first address character is concurrently stored in the originating register as previously indicated.

It is recalled that, if the originating subscriber goes back "on hook" before the call is completed or stays "off-hook" and the "reverse connection" is set-up, control logic 12 goes to the OPC20 state or the "Cross-Office Address" state, respectively. Control logic 12 thereupon applies a bit to the FREE OR lead. The FREE OR lead extends to the input of decoder 320. Decoder 320 is concurrently receiving the OR identity word from address bus 2A. Accordingly, decoder 320 passes the bit on the FREE OR lead to the RESET input of the 300 cell and the RESET input of the 301 cell corresponding in both cases to the originating register identified by the OR identity word. The 1 bit on the FREE OR lead resets the 300 and 301 cells to thereby insert a 0 bit in each cell.

ORIGINATING REGISTERS

Figure 4:
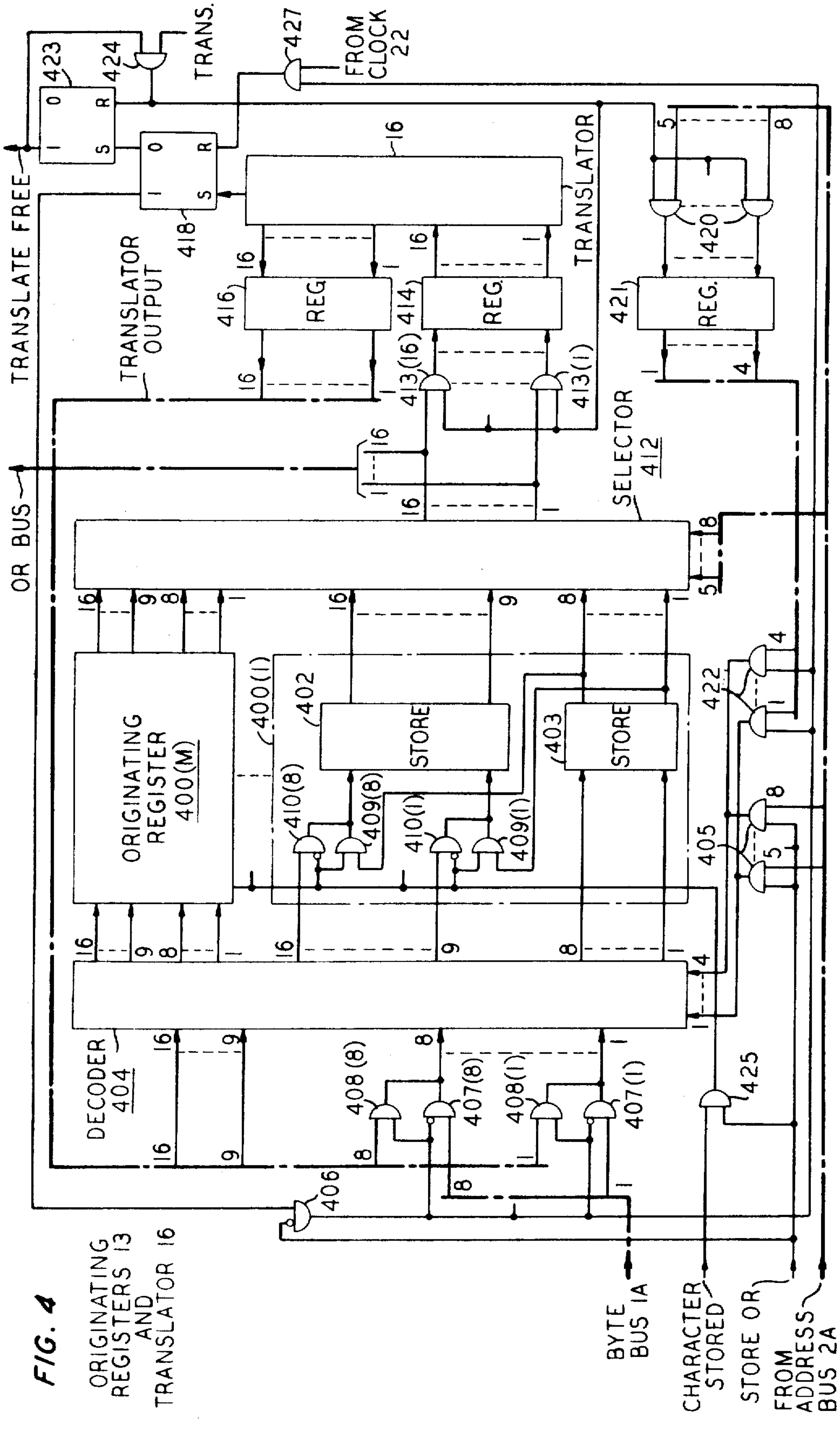
FIG. 4 discloses, in schematic form, the details of the originating registers and the manner in which the registers cooperate with the dialing character translator.

Originating registers 13, together with translator 16, are shown in FIG. 4. As shown in the Figure, there are provided M originating registers, identified as registers 400(1) through 400(M). The several registers are substantially identical and each register includes a pair of eight-bit stores. Considering originating register 400(1), the two stores are identified as store 402 and store 403. Each of the stores includes a sufficient number of cells to store in address character or byte which constitutes eight bits.

The eight leads of byte bus 1A are connected to the inputs of originating registers 13, as previously described. These leads extend to eight gates, the first and last gates being identified as gates 407(1) and 407(8). The outputs of these gates are then passed to input terminals 1 to 8 of decoder 404.

In addition to input terminals 1 to 8, decoder 404 has an additional eight input terminals 9 to 16 to thereby accommodate sixteen input leads. Decoder 404 also includes M groups of output terminals, each group having sixteen output terminals. Each group of output terminals is connected, in turn, to one of the originating registers. Control inputs for decoder 404 are provided by one or the other of multiple gates 405 and 422. In accordance with the control exercised by one or the other of these multiple gates, it is a function of decoder 404 to selectively extend the input leads connected to input terminals 1 to 16 to a selected one of the groups of output terminals and thence to a selected one of originating registers 400(1) through 400(M).

Assume now that a first address character is being received and control logic 12 instructs registers 13 to store the character by applying a bit to lead STORE OR. The bit on lead STORE OR enables multiple gates 405 and concurrently disables gate 406. Gate 406 enables gates 407(1) to 407(8) to pass the byte bus 1A to input terminals 1 to 8 of decoder 404. With multiple gates 405 enabled, the OR identity word on leads 5 to 8 of address bus 2A is gated therethrough and then to the control inputs of decoder 404. Decoder 404, therefore, selects the originating register identified by the OR identity word on address bus 2A.

Assume now that the originating register identified as above constitutes originating register 400(1). In this event, the input leads connected to input terminals 1 through 16 of decoder 404 are selectively extended to those output leads connected to originating register 400(1). The code pattern on the leads connected to input terminals 1 to 8 comprise the address character derived from byte bus 1A, as previously described. The first address character is consequently stored in store 403. The code pattern on input terminals 9 to 16 and the information stored in store 402 are not material at this time.

When the second character is received from the subscriber, control logic 12 again pulses the STORE OR lead. At this time, as previously described, originating register selector 14 is applying a 1 bit to lead CHARACTER STORED. The 1 bit on the CHARACTER STORED and STORE OR leads enables gate 425 which, in turn, enables a sequence of eight gates wherein the first gate is identified as gate 409(1) and the last gate is identified as gate 409(8). The enabling of these gates operates to take the first address character presently stored in character store 403 and gate the bits of the character into character store 402. At the same time, the bit on the STORE OR lead enables multiple gates 405, whereby decoder 404, together with gates 407(1) to 407(8) obtains the second address character now on byte bus 1A and inserts it into character store 403 in the same manner as the first address character was previously registered therein. Accordingly, at this time, the first address character is stored in store 402 and the second character is stored in store 403.

After the two address characters are stored, control logic 12 applies a bit to the output TRANSLATE lead, as previously described. If the translator is free, flip-flop 423 is set, as described hereinafter, and the output of the flip-flop enables gate 424. The bit in the TRANSLATE lead is therefore passed through gate 424 to enable a series of 16 gates, identified as gates 413(1) through 413(16). The bit through gate 424 also enables multiple gates 420. Multiple gates 420 are thus enabled to pass the OR identity word, obtained from leads 5 to 8 of address bus 2A, into register 421. In addition, the bit applied through gate 424 is passed to the RESET input of flip-flop 423. This clears the flip-flop. Gate 424 is disabled and lead TRANSLATE FREE goes low to indicate to write control 17 that the translator is unavailable.

The OR identity word on address bus 2A is also applied to the control inputs of selector 412. The code pattern inputs for selector 412 are provided by originating registers 400(1) to 400(M), each originating register applying a pattern of 16 bits to 16 input terminals of selector 412. The application of the OR identity word to selector 412 operates to select the originating register identified by the word (which we have assumed to be originating register 400(1)). The sixteen output leads of register 400(1) are thereby selectively steered to the 16 output terminals of selector 412 and the bit pattern thus applied to the output terminals is passed through gates 413(1) to 413(16) and stored in register 414.

The output of register 414 is applied to translator 16. Translator 16 functions to translate the two-character address into a 16-bit cross-office address word. This cross-office address word is then passed from the output of translator 16 into register 416. At the same time, translator 16 applies an output pulse to flip-flop 418, setting the flip-flop, which drives its 1 output high. This output extends to gate 406. At this time control logic 12 is not concurrently applying a bit to the STORE OR lead. Gate 406 is therefore enabled and the 1 bit provided by flip-flop 418 is passed through gate 406. The output of gate 406 extends to "not" inputs of gates 407(1) to 407(8) and inputs of another series of gates, the first gate of this series being identified as gate 408(1) and the last gate being identified as gate 408(8). Gates 407(1) to 407(8) are therefore disabled and gates 408(1) to 408(8) are enabled. Gate 406 at this time also enables multiple gates 422 and enables gate 427. The enabling of gate 425 permits the passage of the next clock pulse (from system clock 22) to reset flip-flop 418.

The enabling of gates 408(1) to 408(8) passes the first eight bits of the cross-office address word stored in register 416 to input terminals 1 to 8 of decoder 404; the ls last eight bits of the word being applied directly from register 416 to input terminals 9 to 16. The enabling of multiple gates 422 passes the OR identity word stored in register 421 to the control inputs of decoder 404. Accordingly, at this time, the sixteen bits of the cross-office address word (of the terminating subscriber) are selectively steered through decoder 404 to the 16 input leads of originating register 400(1).

The first eight bits of the cross-office address word are directly stored into character store 403. The final eight bits of the cross-office address word are applied to gates 410(1) to 410(8). As previously noted, control logic 12 is presently applying a 0 bit to the STORE OR lead. This disables gate 425. The output of gate 425 extends to "not" inputs of gates 410(1) to 410(8), as well as to inputs of gates 409(1) to 409(8). Gates 410(1) to 410(8) are therefore enabled and gates 409(1) to 409(8) are disabled. Accordingly, gates 410(1) to 410(8) pass the last eight bits of the cross-office address word into character store 402. Accordingly, when the TRANSLATE pulse is applied, the two address characters are translated and the cross-office word thus obtained is stored in stores 402 and 403 of address register 400(1). Thereafter, so long as the originating register is retained by the originating subscriber, the originating register identity word appears on address bus 2A during each time slot of the originating subscriber. This word is applied to the control inputs of selector 412 and selector 412 selectively obtains the sixteen bits of the cross-office address word from character stores 402 and 403 and passes them to its sixteen output leads. These output leads, it is noted, also extend to the OR bus. The cross-office identity word is, therefore, passed to the OR bus during the time slot of the originating subscriber.

It is noted that translator 16 is permitted to provide only one translation at a time. It is noted that the originating registers give precedence to storing an incoming address character over storing the translated cross-office address word, since the storage of the cross-office address word can be delayed due to its intermediate storage in register 416. This precedence is provided by gate 406 which precludes the storage of the cross-office address word when a bit is applied to the STORE OR lead.

It was previously noted that flip-flop 423 provides the function of advising write control 17 whether or not the translator is free. When the translator function is performed, gate 406 enables gate 427 which, in turn, passes the next clock pulse to the RESET input of flip-flop 418, as previously described. The flip-flop is cleared and the 0 output of the flip-flop therefore goes high. This sets flip-flop 423 and the high output from flip-flop 423 is passed to the TRANSLATE FREE lead. The high output indicates to write control 17 that the translator is free.

WRITE CONTROL

Figures 5A, 5C:
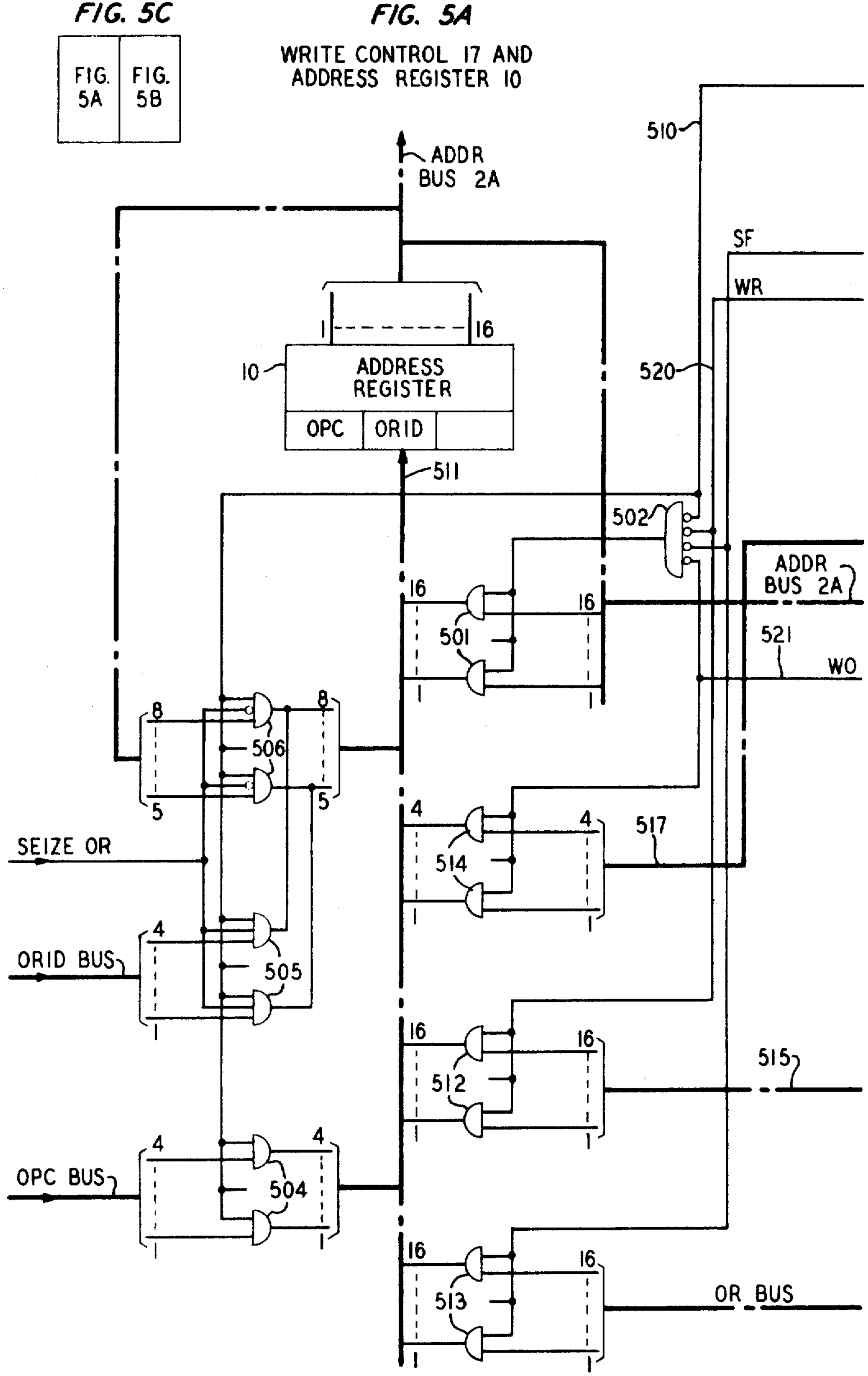
FIG. 5A and FIG. 5B, when arranged as shown in FIG. 5C, show the details of circuitry for writing words into the address list (hereinafter referred to as an address register)
Figure 5B:
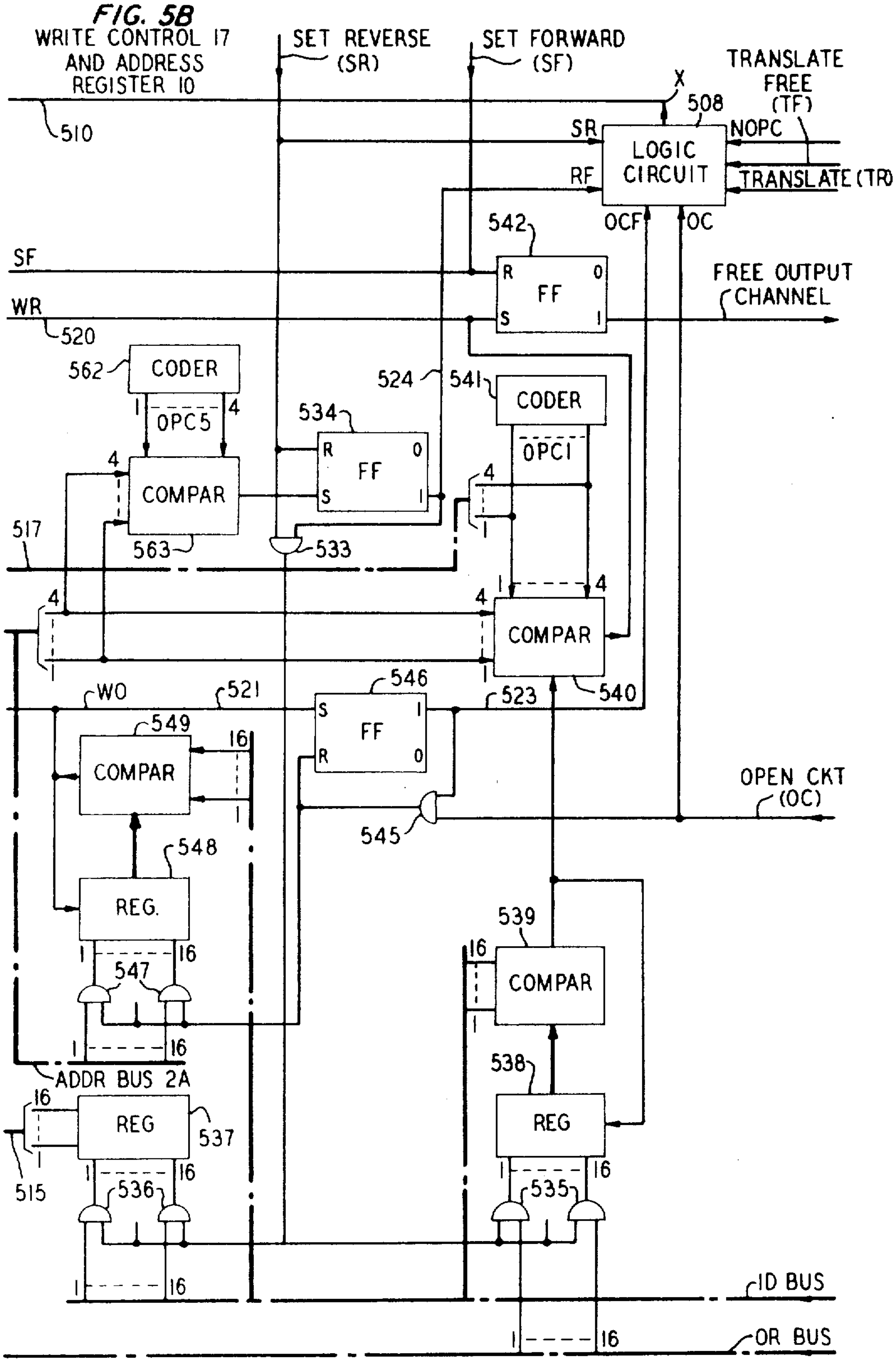

The details of write control 17, cooperating with address register 10 and address bus 2A, are shown in FIGS. 5A and 5B when arranged as shown in FIG. 5C. As previously explained, address register 10 contains a plurality of registers equal in number to the number of channels on byte bus 1A. Each of the registers in address register 10 contains a sufficient number of storage cells therein to store a cross-office address word which, in this particular embodiment, comprises 16 bits. In addition, as previously discussed, any register may alternatively store the four-bit status word and a four-bit OR identity word. The status word is advantageously stored in the first four storage cells and the OR identity word is stored in a subsequent four of the storage cells of each register in address register 10.

Inputting to the last stage of address register 10 is provided by input bus 511. Input bus 511 comprises a plurality of leads, each lead extending to the input of a corresponding one of the storage cells in the last stage of address register 10. The outputting of address register 10 is provided from each storage cell in the front stage of address register 10 to a corresponding one of the leads in address bus 2A.

It is one of the functions of write control 17 to overwrite the status words, the originating register identity words, and the various cross-office address words into the last stage of address register 10. This overwriting is provided by the selective operation of various gates which obtain words on the several input busses and on internal busses in write control 17 and apply the words to particular leads of bus 511. Specifically, as seen in FIG. 5A, when multiple gates 501 are enabled, the address word, the status word, or the status word together with the originating register identity word, is recirculated from address bus 2A through the multiple gates onto bus 511. If multiple gates 504 are enabled, in a manner described hereinafter, the status word derived from the OPC bus from control logic 12 is gated through onto the first four leads of bus 511, thereby overwriting the status word into its appropriate cells in the last stage of address register 10.

In the event that multiple gates 505 or, alternatively, multiple gates 506 are enabled, the originating register identity word on the ORID bus from OR selector 14 or the OR identity word from address bus 2A is passed through respective ones of the multiple gates to bus 511 to be written into the appropriate cells of the last stage of address register 10. Similarly, the enabling of multiple gates 512 and 513 enables the overwriting of a cross-office address word derived from internal bus 515 and derived from the OR bus from originating registers 13 into the last stage of address register 10 by way of bus 511. Finally, the enabling of multiple gates 514 passes the OPC1 status word on internal bus 517 into the last stage of address register 10.

Multiple gates 501 (the gates that recirculate the words in the first stage of register 10 into the last stage) are controlled by gate 502. Gate 502, in turn, is controlled by four input leads. One of these input leads constitutes the SET FORWARD (SF) lead connected to the output of control logic 12. Two other leads are identified as WRITE REVERSE (WR) lead 520 and WRITE OPEN (WO) lead 521. The function of these latter two leads will be described hereinafter. The fourth lead comprises X lead 510, which lead extends from the output of logic circuit 508 (FIG. 5B).

Logic circuit 508 is a combinational circuit having seven inputs. These inputs comprise the NOPC lead, the OPEN CIRCUIT (OC) lead, SET REVERSE (SR) lead and the TRANSLATE (TR) lead, all coming from outputs of control logic 12. The TRANSLATE FREE (TF) lead emanating from originating registers 13 is a fifth input to logic circuit 508. The remaining two leads comprise the OPEN CIRCUIT FREE (OCF) lead 523 and the REVERSE CIRCUIT FREE (RF) lead 524. The operation and function of leads 523 and 524 will be described hereinafter.

The function of logic circuit 508 is to provide a 0 or a 1 bit at the output thereof in accordance with the bits on the several input leads. The circuit is arranged to provide at the output (X) the specific condition as defined by the logic equation:

$$X = NOPC\,(\overline{OC}\cdot\overline{SR}\cdot\overline{TR} + OC\cdot OCF + SR\cdot RF + TR\cdot TF) \quad (1)$$

Examining the logic equation, it is seen that a 0 bit is applied to X lead 510 when a 0 bit is applied to the NOPC lead or when a 1 bit is applied to the NOPC lead and any one of the following three conditions exists:

1. a 1 bit is applied to the OC lead and a 0 bit is applied to the OFC lead; or
2. a 1 bit is applied to the SR lead and a 0 bit is applied to the RF lead; or
3. a 1 bit is applied to the TR lead and a 0 bit is applied to the TF lead.

It is recalled that during the normal IDLE condition, control logic 12 provides a pattern of 0 bits to its output terminals. A 0 bit is therefore passed to the NOPC lead.

Logic circuit 508 therefore provides a 0 bit to its output, and this 0 bit is therefore passed to lead 510. At the same time, control logic 12 is applying a 0 bit to the SET FORWARD (SF) lead. As will be explained hereinafter, 0 bits are also being applied to WR lead 520 and WO lead 521. Leads 510, SF, 520 and 521 extend to "not" inputs of gate 502 and with all the leads carrying 0 bits, gate 502 provides a 1 bit at the output thereof. This 1 bit is passed to multiple gates 501 and the gates are enabled to recirculate the status word on address bus 2A to the last stage of address register 10, as previously described.

Assume now that an "off-hook" signal is received from the subscriber. Control logic 12 generates a new status word and applies a 1 bit to the NOPC lead. At the same time, control logic 12 applies 0 bits to the OPEN CIRCUIT, SET REVERSE, and TRANSLATE leads. Logic circuit 508, in response thereto, applies a 1 bit to X lead 510. Gate 502 thereupon applies a 0 bit to multiple gates 501 and the gates are therefore disabled.

The 1 bit on X lead 510 is also passed to multiple gates 504, enabling these gates. The next status word provided by control logic 12 to the OPC bus is therefore passed through multiple gates 504 and into the last stage of address register 10 by way of bus 511. This new status depends on whether or not an originating register is available. If we assume that an originating register is not available, this new status word would, of course, be OPC20. The present state becomes OPC20 and, in the next frame, control logic 12 applies the OPC1 status word to the OPC bus and passes a 1 bit to the NOPC lead. Multiple gates 504 are again enabled, the OPC1 status word is written into the last stage of address register 10 and the channel is returned to the IDLE condition, as previously described.

Assume now that an originating register is free. The new status word is OPC2 and this word is passed through multiple gates 504 into the last stage of address register 10. Control logic 12 also applies a 1 bit to the SEIZE OR lead. Multiple gates 505 are controlled by lead 510 and the SEIZE OR lead and, with 1 bits on both leads, the gates are enabled. Multiple gates 505 thereupon pass the originating register identity word on the ORID bus to bus 511, to be written into the last stage of address register 10.

Control logic 12 is now in the OPC2 state. If the subscriber then goes "on-hook", control logic 12 applies the OPC20 status word to the OPC bus and pulses the NOPC lead. The OPC20 word is thereupon written into the last stage of address register 10 and, during the next frame, the OPC1 status word is written into the register in the same manner as previously described.

Assume now that the subscriber remains "off-hook". Control logic 12, in the OPC2 state, looks for the first address character. For any pattern other than an address character, control logic 12 applies a 0 pattern to its output terminals. This enables multiple gates 501 to recirculate the OPC2 status word and the OR identity word from address bus 2A to the last stage of register 10, as previously described.

When the first address character is received, the character is written into the originating register. Write control 17 continues to recirculate the status word and the originating register identity word.

Upon the reception of the second address character, control logic 12 applies a 1 bit to the NOPC lead, applies a 0 bit to the SEIZE OR lead and applies the OPC3 status word to the OPC bus. Multiple gates 504 are enabled to overwrite the OPC3 status word into the last stage of register 10. At the same time, logic 508 applies a 1 bit to X lead 510. Gate 502 and multiple gates 505 are disabled. Lead 510 also extends to inputs of multiple gates 506 and lead SEIZE OR is connected to "not" inputs of the multiple gates. Multiple gates 506 are therefore enabled to recirculate the originating register identity word on address bus 2A into the last stage of address register 10. Address register 10, therefore, now contains the OPC3 status word and the (unchanged) originating register identity word.

When the OPC3 status word appears on address bus 2A, control logic 12 applies the OPC4 status word to the OPC bus, a 1 bit to lead NOPC, and a 1 bit to the TRANSLATE lead.

Consider first the situation where translator 16 is not free. A 0 bit is therefore being applied to lead TRANSLATE FREE. Logic circuit 508 therefore applies a 0 bit to X lead 510. Gate 502 produces a 1 bit, under the necessarily existing conditions that 0 bits are provided to the SET FORWARD lead and to leads 520 and 521. The 1 bit output of gate 502 enables multiple gates 501 and the OPC3 status word, together with the originating register identity word, is recirculated back to address register 10.

Assume now that translator 16 is free or, in the alternative, had been busy and has now become free. A 1 bit is therefore applied to lead TRANSLATE FREE and, with 1 bits applied to the NOPC lead and the TRANSLATE lead, logic circuit 508 provides a 1 bit to X LEAD 510. This 1 bit enables multiple gates 504 and the gates obtain the OPC4 status word from the OPC bus and overwrite the word into address register 10. At the same time, the 1 bit on X lead 510 enables multiple gates 506 and they recirculate the originating register identity word to the last stage of address register 10.

When the OPC4 status word is applied to address bus 2A, control logic 12 passes an OPC5 status word to the OPC bus and at the same time applies 1 bits to the NOPC lead and the SET REVERSE (SR) lead. In the event that the "reverse write" circuit is occupied, a 0 bit is concurrently on RF lead 524, as described hereinafter. In this event, logic circuit 508 passes a 0 bit to X lead 510 and gate 502 enables multiple gates 501 to recirculate the status and originating register identity word.

If we assume that the "reverse write" circuit is free, or has become free, a 1 bit is applied to RF lead 524. With 1 bits applied concurrently to leads NOPC and SET REVERSE (SR), logic circuit 508 passes a 1 bit to X lead 510. This enables multiple gates 504 and the OPC5 status word generated by control logic 12 is written into the last stage of address register 10. At the same time, with a 0 bit on the SEIZE OR lead, multiple gates 506 are enabled and the originating register identity word is recirculated back into address register 10.

The 1 bit applied to the SET REVERSE lead by control logic 12 is also passed to gate 533 and to the RESET input of flip-flop 534, FIG. 5B. Flip-flop 534 was previously in the "set" condition, providing a 1 bit output to RF lead 524. This has enabled gate 533. The 1 bit on the SET REVERSE lead is therefore passed by gate 533 to multiple gates 535 and to multiple gates 536. At this time the 1 bit on lead SR clears flip-flop 534. Flip-flop 534 applies 0 bit to RF leads 534, the "r-everse write" circuit is no longer free, and gate 533 is disabled.

The enabling of multiple gates 536 passes the identity word on the ID bus to register 537 thereby storing the cross-office address word of the originating subscriber in the register. At the same time, multiple gates 535 obtain the cross-office address word of the terminating subscriber (which has previously been translated) from the OR bus (extending from originating registers 13) and pass the word to register 538. Accordingly, register 537 now contains the cross-office address word of the originating subscriber and register 538 contains the cross-office address word of the terminating subscriber.

The cross-office address word of the terminating subscriber in register 538 is now compared, by comparator 539, with the successive identity words on the ID bus. An identical comparison of the word in register 538 will therefore be achieved with a word on the ID bus during the time slot dedicated to the terminating subscriber. Accordingly, during the time slot of the terminating subscriber, a comparison is achieved and comparator 539 generates an output bit. This bit is applied to comparator 540 to enable this comparator and is passed back to register 538 to clear the register.

The word inputs to comparator 540 are provided by coder 541 and by the first four leads on address bus 2A. As previously noted, the first four leads on the address bus carry the status word. Coder 541 is arranged to produce a fixed word which comprises the OPC1 status word. Comparator 540, when enabled by comparator 539, provides an output bit in the event that the status word on address bus 2A is the OPC1 word. Since comparator 540 is enabled in the time slot of the terminating subscriber, it provides an output bit only if the terminating subscriber is in the IDLE condition.

Assume first that the terminating subscriber is not IDLE. The word on address bus 2A therefore does not constitute the OPC1 status word and comparator 540 does not provide a bit to its output. The output of comparator 540 extends to the SET input of flip-flop 542. As described hereinafter, flip-flop 542 is normally in the CLEAR or RESET condition. The failure of comparator 540 to apply a bit to the SET input of the flip-flop results in flip-flop 542 being maintained in the CLEAR condition. Flip-flop 542 passes 0 bits to its output lead, which lead comprises the FREE OUTPUT CHANNEL lead. This indicates to control logic 12 that the terminating subscriber is busy. As previously described, control logic 12 goes to the OPC20 state during the next frame, and the processor sends a busy signal to the originating subscriber and overwrites the OPC20 status word into address register 10.

Assume now that the terminating subscriber is idle and the OPC1 status word is being recirculated during his time slot. A comparison is thus achieved by comparator 540. The 1 bit at its output sets flip-flop 542 to thereafter indicate to control logic 12 that the terminating subscriber is IDLE and in condition to receive a call. The 1 bit output of comparator 540 is also passed to WR lead 520 and then to gate 502 to disable the gate. Gate 502 thereupon disables, in turn, multiple gates 501. At the same time, the 1 bit on WR lead 520 enables multiple gates 512. These gates obtain the cross-office address word of the originating subscriber on bus 515, which extends from the output of register 537, and pass the word to bus 11 and then to the last stage of address register 10. Since we have assumed that the concurrent time slot corresponds to the time slot of the terminating subscriber, the overwriting of the cross-office address word of the originating subscriber into the last stage of address register 10 effectively applies this cross-office address word onto address bus 2A during the terminating subscriber's time slot. The reverse connection is therefore completed by the process.

When the time slot of the originating subscriber occurs during the next frame, the OPC5 status word appears on address bus 2A. This status word is applied to comparator 563. The other input to comparator 563 comprises the word output of coder 562. Coder 562 generates a fixed word which comprises the OPC5 status word. Since the OPC5 status word is on address bus 2A, a comparison is achieved and comparator 563 passes a bit to the SET input of flip-flop 534. Flip-flop 534 is therefore set and 1 bits are passed to RF output lead 524. Gate 533 is again enabled and the indication that the "reverse write" circuit is now free is passed to logic circuit 508.

With the appearance of the OPC5 status word on address bus 2A, together with the 1 bit on the FREE OUTPUT CHANNEL lead, control logic 12 applies a bit to the SET FORWARD (SF) lead. The bit on the SET FORWARD lead resets flip-flop 542, restoring the flip-flop to the initial CLEAR condition and reapplying a 0 bit to the FREE OUTPUT CHANNEL lead. In addition, the 1 bit on the SET FORWARD lead disables gate 502, disabling, in turn, multiple gates 501. Moreover, the 1 bit on the SF lead is applied to multiple gates 513. Multiple gates 513 are enabled and thereupon obtain the cross-office address word of the terminating subscriber from the OR bus (extending from originating registers 13) and overwrite the cross-office address word into address register 10. The forward connection operation by the processor is now completed and the full duplex talking connection is established.

As previously described, the talking connection is terminated by either subscriber when he "hangs up". An "on-hook" signal is thereupon sent by the subscriber (originating or terminating) and control logic 12, upon recognizing the "on-hook" character, applies the OPC1 status word to the OPC bus and at the same time applies 1 bits to the NOPC lead and to the OPEN CIRCUIT (OC) lead. Write control 17 is thereby instructed to "take down" the call.

Flip-flop 546, FIG. 5B, indicates whether or not the "call take down" circuit is free. In the event that the "-call take down" circuit is busy, flip-flop 546 is in the CLEAR or RESET condition. In this event, the output of the flip-flop is low and a 0 bit is passed to lead 523. The bit on lead 523 disables gate 545 and is concurrently passed to input OCF of logic circuit 508. As indicated above, control logic 12 is applying 1 bits to the NOPC lead and the OPEN CIRCUIT (OC) lead. Logic circuit 508 therefore applies a 0 bit to output lead 510. This 0 bit thus disables multiple gates 504, 505 and 506. At the same time, the 0 bit is applied to gate 502. The other input leads to gate 502, at this time, are also necessarily 0. The output of gate 502 therefore passes a 1 bit to multiple gates 501. Multiple gates 501 therefore recirculate the cross-office address word on address bus 2A back to the last stage of address register 10. The take down of the call thus must await until the arrival of the next frame.

Assume now that the "call take down" circuit is free when the NOPC and OC leads are pulsed. In this event, flip-flop 546 is in the SET condition. Flip-flop 546 therefore passes 1 bits to OCF lead 523, which extends to logic circuit 508 and to gate 545.

With a 1 bit passed to OCF lead 523, together with the application of 1 bits to the NOPC lead and the OPEN CIRCUIT (OC) lead, logic circuit 508 applies a 1 bit to its output lead 510. This disables gate 502 and enables multiple gates 504. The OPC1 status word being generated by control logic 12 is therefore passed through multiple gates 504 and overwritten into the last stage of address resister 10. The "idle" status word is therefore written into the address stage corresponding to the subscriber who had gone "on-hook".

It is recalled that with the "call take down" circuit free, flip-flop 546 applies 1 bits to gate 545 to enable the gate. The 1 bit applied to the OPEN CIRCUIT (OC) lead by control logic 12 is therefore passed through gate 545, clearing flip-flop 546 and enabling multiple gates 547. The resetting of flip-flop 546 provides the indication that the "call take down" circuit is now occupied. At the same time, the enabling of multiple gates 547 passes the cross-office address word of the "other" subscriber (the subscriber other than the one going back "on-hook") now on address bus 2A into register 548.

Comparator 549 now compares the cross-office address word in register 548 with the identity word on the ID bus. An identical comparison is thereafter achieved when the time slot of the "other" subscriber arrives on address bus 2A. At this time, comparator 549 passes a 1 bit to WO lead 521. This 1 bit on lead 521 sets flip-flop 546, clears register 548 and enables multiple gates 514.

The setting of flip-flop 546 returns the "call take down" circuit to the free or available condition. The clearing of register 548 now renders the register available for the next "take down" operation. Multiple gates 514 obtain the OPC1 status word provided on bus 517 (which extends to the output of coder 541) and pass the word to bus 511. This "idle" status word is therefore written into the stage of address register 10 which corresponds to the "other" subscriber and both subscribers are therefore returned to the IDLE condition.

WORD GENERATOR AND INTERFACE

Figure 6:
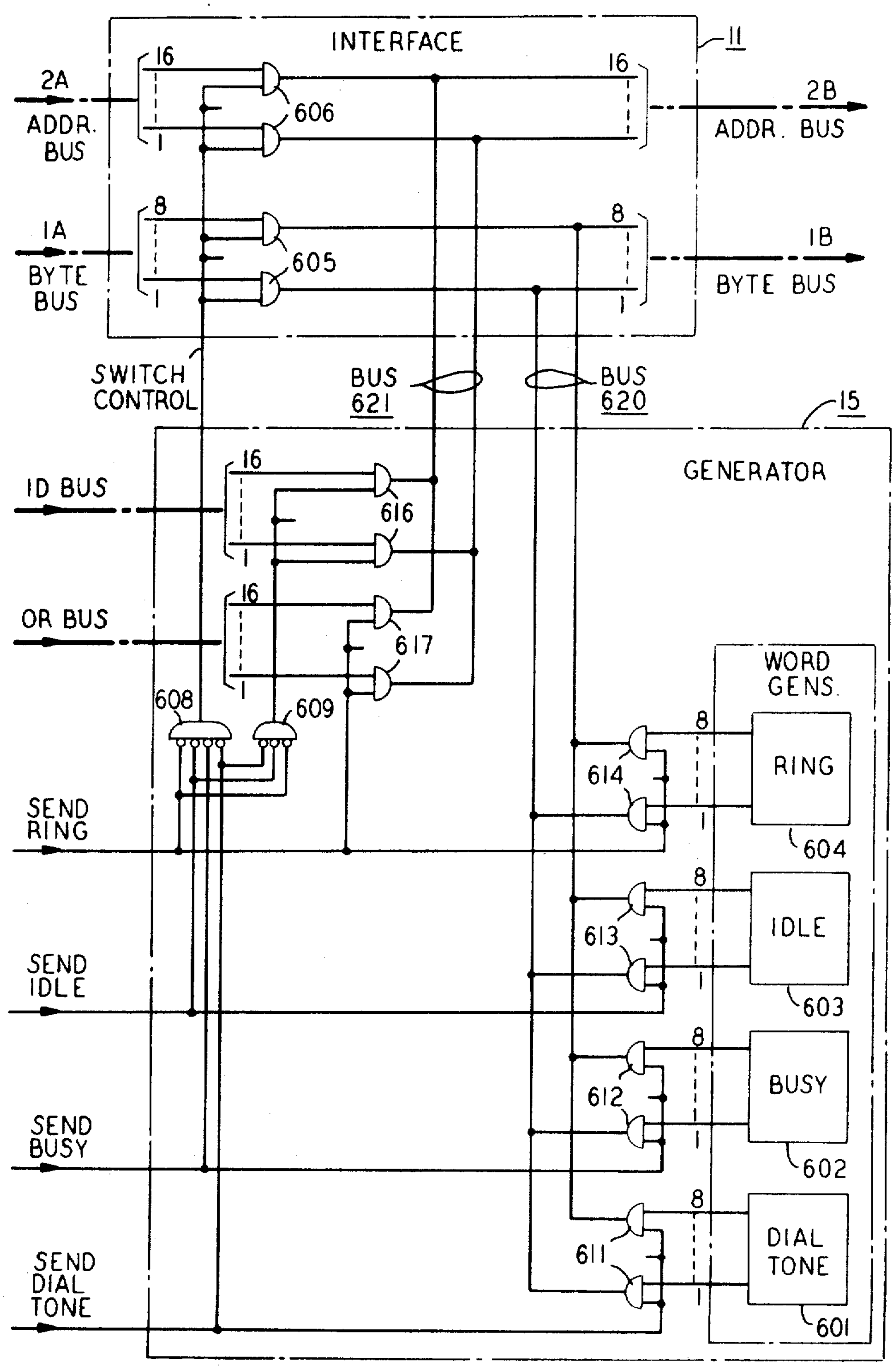
FIG. 6 depicts, in schematic form, the circuitry for producing the supervisory words (such as "dial tone" and "ringing") and the manner in which the supervisory words are applied to the byte bus and the accompanying address words are applied to the address bus.

The circuitry of generator 15 and interface 11 is shown in FIG. 6. Generator 15 includes a plurality of word generators, which are individually identified as dial tone generator 601, busy generator 602, idle generator 603 and ring generator 604. Each of the generators is arranged to produce a particular eight-bit character or byte defining a specific supervisory character and apply the bits, in parallel, to eight output leads.

Dial tone generator 601 produces the "dial tone" character and applies this character to output leads extending to multiple gates 611. Similarly, busy generator 602, idle generator 603 and ring generator 604 produce the "busy" character, the "idle" character and the "ring" character and individually apply the character thus produced to output leads extending to multiple gates 612, 613 and 614, respectively.

Assume first a situation wherein control logic 12 is producing an all 0 bit output pattern. None of the leads SEND DIAL TONE, SEND BUSY, SEND IDLE or SEND RING has a 1 bit applied thereto. All of the input leads of gate 608 are therefore down and the output of gate 608 is up. This up, or 1 bit, condition is passed through the SWITCH CONTROL lead to interface 11. In interface 11, the SWITCH CONTROL lead is connected to the inputs of multiple gates 605 and 606, thereby enabling the multiple gates. Multiple gates 605, enabled, pass the signals on the leads of byte bus 1A through interface 11 to byte bus 1B. Similarly, multiple gates 606, enabled, pass the signals on the leads of address bus 2A through interface 11 to address bus 2B.

We have presumed that control logic 12 is producing an all 0 bit output pattern. The input leads of gate 609 are therefore all down and gate 609 is passing a 1 bit to "not" inputs of multiple gates 616. Multiple gates 616 are therefore disabled. At the same time the 0 bits on the several above-described leads from control logic 12 disable multiple gates 611 to 614 and disable multiple gates 617. Accordingly, under this assumed condition, the byte, if any, on byte bus 1A and the word, if any, on address bus 2A are passed through interface 11 to byte bus 1B and address bus 2B, respectively.

Assume now that control logic 12 sends a bit to the SEND DIAL TONE lead. The 1 bit on the lead forces the outputs of gates 608 and 609 to go down. Gate 608 thereupon disables multiple gates 605 and 606, while gate 609 enables multiple gates 616. At the same time the 1 bit on the SEND DIAL TONE lead enables multiple gate 611.

The disabling of multiple gates 605 and 606 disconnects byte bus 1A from byte bus 1B and similarly disconnects address bus 2A from address bus 2B. With multiple gates 616 enabled, the cross-office address word on the ID bus is passed to bus 621. The leads of bus 621, in turn, are connected to the several leads of address bus 2B. At the same time, with multiple gates 611 enabled, the "dial tone" character or byte generated by dial tone generator 601 is passed onto bus 620. The leads of bus 620 are connected to the several leads of byte bus 1B. Accordingly, upon the application of a 1 bit to the SEND DIAL TONE lead, the "dial tone" character is passed onto bus 1B and the cross-office address of the subscriber associated with the current time slot is applied to address bus 2B.

When control logic 12 applies a 1 bit to the SEND BUSY lead, the output of gate 608 goes low, and multiple gates 605 and 606 are disabled to disconnect byte bus 1A from byte bus 1B and disconnect address bus 2A from address bus 2B, as previously described. At the same time, gate 609 enables multiple gates 616 and the cross-office address word on the ID bus is passed to address bus 2B. The 1 bit on the SEND BUSY lead enables multiple gates 612. The "busy" character generated by busy generator 602 is therefore applied to byte bus 1B.

Assume now that control logic 12 applies a 1 bit to the SEND IDLE lead. The outputs of gates 608 and 609 go down, byte bus 1A and address bus 2A are disconnected from byte bus 1B and address bus 2B, multiple gates 616 are enabled, and the cross-office address word on the ID bus is applied to address bus 2B, as previously described. At the same time, the 1 bit on the SEND IDLE lead enables multiple gates 613. The "idle" character generated by idle generator 603 is therefore applied to byte bus 1B.

When control logic 12 applies a 1 bit to the SEND RING lead the output of gate 608 goes down and byte bus 1A and address bus 2A are disconnected from byte bus 1B and address bus 2B, as previously described. At the same time, the 1 bit on the SEND RING lead enables multiple gates 614 and 617. The enabling of multiple gates 617 passes the cross-office address word of the terminating subscriber on the OR bus 621 and then to address bus 2B. With multiple gates 614 enabled, the "ringing" character generated by ring generator 604 is applied to byte bus 1B.

Although a specific embodiment of this invention has been shown and described, it will be understood that various modifications may be made without departing from the spirit of this invention.

We claim:

1. In a time-division switch wherein data signals from a plurality of incoming channels are applied to a common data bus, each channel being allocated a time slot in a frame, and wherein the data signals on the data bus are directed to an output port by an address word concurrently appearing on an address bus, a processor comprising:

a recirculating store having a recirculating time equivalent to a frame interval and having storage areas for storing an address word for each time slot, the output of the store being applied to the address bus, and a logic circuit responsive to the store output applied to the address bus and the data on the data bus for generating words defining the status of each channel whose allocated time slot is not accompanied by a concurrent address word and means responsive to the logic circuit for precluding the recirculation of the store and for writing the status word into a portion of the storage area normally storing the address word.

2. In a time-division switch, a processor in accordance with claim 1 and further including a register selector responsive to the logic circuit for seizing one of the registers, for generating a word defining the identity of the seized register and for writing the identity word into another portion of the storage area differing from the portion containing the status word.

3. In a time-division switch, a processor in accordance with claim 1 and further including a plurality of registers responsive to the data from the data bus for producing the address words and for writing each address word into the store.

4. A processor for processing data signals on a data bus, each data signal appearing on the data bus during a time slot in a frame and, after a call connection has been set up, being directed to an output port selected by an address signal concurrently appearing on an address bus, comprising:

control means for generating control signals before a call connection is set up and for generating address signals after a call connection is set up, a feedback circuit for feeding the generated control and address signals back to an input of the control means, the control means further including means responsive to the generated control and address signals for determining the status of the call connection, and means for applying the output of the feedback circuit to the address bus to thereby apply address signals to the address bus.

5. A processor in accordance with claim 4 wherein the feedback circuit includes a delay circuit for delaying the generated control and address signals for a frame interval.

6. A processor in accordance with claim 5 wherein the control means is responsive to the data signals on the data bus and the delayed control and address signals.

7. A processor in accordance with claim 6 wherein the control means includes a logic circuit having a plurality of states, wherein the generated control and address signals define the states of the logic circuit, and wherein means place the logic circuit in the defined states in response to the delayed control and address signals, the logic circuit including means effective when the logic circuit is in the defined states for generating the control signals in response to data signals on the data bus.

8. A processor in accordance with claim 7 wherein the control means includes other means controlled by the logic circuit in one of the defined states for generating the address signals in response to data signals on the data bus.

9. A processor in accordance with claim 8 wherein the control means includes means responsive to the logic circuit for generating information signals defining the identity of the address signal generating means and for applying the information signals to the delay circuit whereby delayed control and information signals are concurrently fed back to the control means.

10. A processor in accordance with claim 9 wherein means responsive to the logic circuit recycles the delayed control, information and address signals back to the input of the delay circuit whereby any one of the control, information and address signals is applied to the control means for two successive frames.

11. A processor in accordance with claim 10 wherein the recycling means recycles the control signal in the absence of the generation of a new control signal by the logic circuit.

12. A processor in accordance with claim 10 wherein the recycling means recycles the address signal in the absence of the generation of a new control signal by the logic circuit.

* * * * *